(12) United States Patent
Patel et al.

(10) Patent No.: US 12,378,158 B1
(45) Date of Patent: Aug. 5, 2025

(54) REACTIVE GRINDING AIDS AND STRENGTH-ENHANCING AGENTS FOR SLAG AND OTHER MATERIALS

(71) Applicant: Verdment Brazil Ltda., Santo Andre (BR)

(72) Inventors: Rajeshkumar Patel, Catonsville, MD (US); Akira Matsui, São Paulo (BR); Frederick Katsuro Schmidt, Minato-Ku (JP); Caio Suzuke Pimenta dos Reis, São Paulo (BR)

(73) Assignee: Verdment Brazil Ltda., Centro (BR)

( * ) Notice: Subject to any disclaimer, the term of this patent is extended or adjusted under 35 U.S.C. 154(b) by 0 days.

(21) Appl. No.: 19/029,170

(22) Filed: Jan. 17, 2025

(51) Int. Cl.
| | |
|---|---|
| *C04B 7/153* | (2006.01) |
| *C04B 7/19* | (2006.01) |
| *C04B 7/52* | (2006.01) |
| *C04B 12/00* | (2006.01) |
| *C04B 14/06* | (2006.01) |
| *C04B 28/00* | (2006.01) |
| *C04B 28/08* | (2006.01) |
| *C04B 103/52* | (2006.01) |

(52) U.S. Cl.
CPC ............. *C04B 7/1535* (2013.01); *C04B 7/19* (2013.01); *C04B 7/52* (2013.01); *C04B 12/005* (2013.01); *C04B 14/06* (2013.01); *C04B 28/006* (2013.01); *C04B 28/082* (2013.01); *C04B 2103/52* (2013.01); *C04B 2201/52* (2013.01)

(58) Field of Classification Search
CPC ........... C04B 7/1535; C04B 7/19; C04B 7/52; C04B 12/005; C04B 14/06; C04B 28/006; C04B 28/082; C04B 2103/52; C04B 2201/52
See application file for complete search history.

(56) References Cited

U.S. PATENT DOCUMENTS 5,076,851 A * 12/1991 Skovara ................ C04B 28/04
106/713

FOREIGN PATENT DOCUMENTS

| CA | 3087303 A1 | * | 7/2019 | ............ B02C 23/06 |
|---|---|---|---|---|
| CN | 101712537 A | * | 5/2010 | ............ C04B 18/08 |
| CN | 102923982 A | * | 2/2013 | ............ C04B 18/14 |
| CN | 111099846 A | * | 5/2020 | ............. C04B 7/26 |
| CN | 111233364 A | * | 6/2020 | ............ C04B 28/04 |
| CN | 115321898 A | * | 11/2022 | ............ C04B 28/04 |
| GB | 2504904 B | * | 12/2014 | .......... C04B 28/021 |
| JP | 5-17183 A | * | 1/1993 | ............ C04B 7/147 |
| JP | 08-12387 A | * | 1/1996 | .............. C04B 7/21 |
| JP | H2008-12387 | | 1/1996 | |
| KR | 100894587 B1 | * | 4/2009 | ............ C04B 18/14 |
| WO | WO-2015049010 A1 | * | 4/2015 | ............ C04B 28/00 |

* cited by examiner

*Primary Examiner* — Anthony J Green
(74) *Attorney, Agent, or Firm* — Jones Day

(57) ABSTRACT

The present invention relates to the use of grinding aids comprising Aluminum sulfate, Alum, and/or Na salt, K salt, or Li salt of a hydroxycarboxylic acid, wherein the hydroxycarboxylic acid comprises citric, lactic, glycolic, tartaric, acetic, or malic acid, for producing Ground Activated Cementitious Precursor Material (GACPM) by co-grinding with granulated slag, such as a steel industry waste, Granulated Blast Furnace Slag (GBFS), and the products provided therefrom. The use of the one or more grinding aids reduces the grinding time by about 10-33%, improves particle fineness by about 10-33%, and/or reduces carbon emissions ($CO_2$) associated with such processes by about 10-33%, thereby significantly enhancing efficiency. Additionally, it improves particle morphology and activates amorphous glass particles in the GACPM (compared to conventional Ground Granulated Blast Furnace Slag (GGBFS), increasing their reactivity with alkali activators in geopolymer cements or with calcium hydroxide when used with Portland cement applications. This activation, due to use of GACPM instead of GGBFS, leads to compressive strength gains of about 5-33% in activated geopolymer cement mortar/grout/concrete and about 5-33% in Portland GACPM cement blends, all while significantly reducing energy usage, costs, and carbon emissions.

20 Claims, 2 Drawing Sheets

Figure 1:
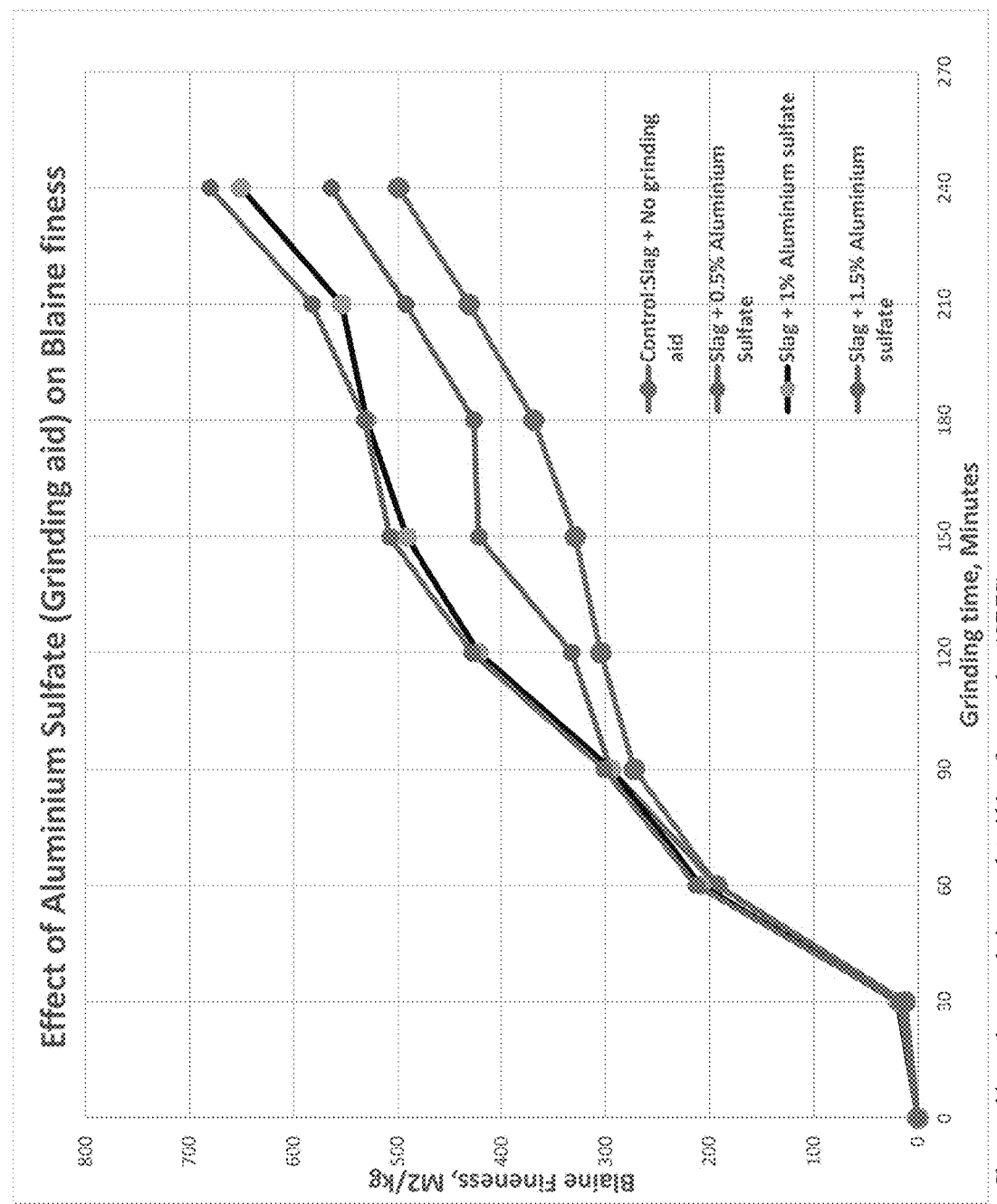

REACTIVE GRINDING AIDS AND STRENGTH-ENHANCING AGENTS FOR SLAG AND OTHER MATERIALS

1. FIELD OF INVENTION

Provided herein are ground activated cementitious precursor materials (GACPM), comprising a material that includes unground granulated slag, a grinding aid, and optionally, pozzolanic material, and methods of preparing and using the same. Further provided herein is an activated geopolymer cement, and methods of preparing and using the same. The activated geopolymer cements disclosed herein have an enhanced reactivity and compressive strength. Further provided herein are an activated geopolymer mortar, grout, and concrete composition and an activated geopolymer cement, grout, mortar, or concrete composition, and methods of preparing and using the same. Also provided herein are activated Portland slag cement mortar or grout compositions and activated Portland slag cement concrete compositions which have replaced a portion of the Portland cement with the GACPM disclosed herein.

2. BACKGROUND

Climate change is the key challenge with our planet today. Portland cement production is a major contributor to carbon emissions, accounting for about 8% of the world's total carbon dioxide ($CO_2$) emissions.

Granulated Blast Furnace Slag (GBFS) is a by-product of iron and steel making industries. It is obtained by quenching molten iron slag from a blast furnace in water or steam, to produce a glassy, granular product that is then dried. The GBFS is then ground into a fine powder of a required fineness, which is called Ground Granulated Blast Furnace Slag (GGBFS). To reduce carbon emissions and enhance durability, the GGBFS can be blended with Portland cement to form Portland slag cement or be used as partially replacement of Portland cement in Portland cement concrete. One of the main drawbacks in using GGBFS as a partial replacement of Portland cement is when the replacement exceeds 50%, the set time is prolonged and the resulting product has low early strength.

GGBFS is also used in a very limited application as Portland cement free geopolymer cements, also known as alkali activated cements, as a very low carbon emission replacement of Portland cement. Geopolymer cements that use GGBFS also have the drawback of having low working times and low early strength. The preparation of GGBFS also presents challenges. Specifically, the conventional process of grinding GBFS into GGBFS with a fineness of 400-500 $m^2/kg$ requires 40-50 kwh/t energy, equating to approximately 8-10 kg/t carbon emission and an approximate cost of about US$6-7/ton.

3. SUMMARY

In one aspect is provided grinding aids for use in preparing cementitious materials. In one aspect, granulated slag, such as Granulated Blast Furnace Slag (GBFS), is ground in the presence of one or more grinding aids, with or without pozzolanic materials. The one or more grinding aids may comprise Aluminum sulfate, Alum, and hydroxycarboxylic acids including but not limited to citric, lactic, glycolic, acetic, tartaric and malic acid neutralized with Na, K, Li hydroxides or carbonates. During the grinding process, the one or more grinding aids improve the morphology and reactivity of resulting ground particles of GBFS making Ground Activated Cementitious Precursor Material (GACPM), which has an enhanced reactivity and compressive strength. Additionally, the grinding time necessary to achieve a particular Blaine fineness in decreased relative to grinding GBFS in the absence of the one or more grinding aids. The resulting geopolymer cement made with GACPM and mortar, grout, and concrete derivatives of the geopolymer cement made with GACPM also have enhanced compressive strengths. The GACPM can also be used as partial replacement of Portland cement and their derivative mortar, grout, and concrete with improved set time and higher compressive strength.

In one aspect, that the inclusion of one or more of Aluminum sulfate, Alum and/or a Na salt, K salt, or Li salt of a hydroxycarboxylic acid, wherein the hydroxycarboxylic acid comprises citric, lactic, glycolic, tartaric, acetic, or malic acid, as a grinding aid is useful for efficiently grinding granulated slag, such as Granulated Blast Furnace Slag (GBFS), in the preparation of Ground Activated Cementitious Precursor Material (GACPM). In some embodiments, the GACPM is the mixture of the steel industry waste of granulated slag (i.e., unground granulated slag), such as GBFS, grounded together with the one or more grinding aids disclosed herein, and optionally with pozzolanic material, wherein the mixture is grounded to a required fineness. In some embodiments, the one or more grinding aids improve the efficiency of grinding, reducing the grinding time required to prepare the GACPM by about 10-50%, such as about 10-33%, relative to the time period required to achieve the same Blaine fineness from grinding a mixture of granulated slag, such as GBFS, and optionally pozzolanic material, in the absence of a grinding aid. In some embodiments, the one or more grinding aids increases the Blaine fineness of the resulting ground material, wherein the Blaine fineness of the GACPM is between about 10-50% finer, such as 10-33% finer, relative to a Blaine fineness resulting from grinding a mixture of granulated slag, such as GBFS, and optionally pozzolanic material, for the same period of time in the absence of grinding aid.

In another aspect, the use of the disclosed grinding aid during the process of grinding slag, such as GBFS, to prepare GACPM, improves the morphology of the ground particles of the GGBFS and activates the GGBFS' amorphous glass particles. The resulting GACPM, which includes activated GGBFS particles, can be easily and uniformly dissolved with alkali activators and becomes quickly reactive, when used in a geopolymer cement or with a calcium hydroxide or "free lime" (a byproduct of Portland cement hydration) when used in Portland cement as a partially replacement of Portland cement. In another aspect, the GACPM disclosed herein has a higher reactivity relative to GGBFS prepared by grinding in the absence of the grinding aids disclosed herein.

In another aspect, the use of the GACPM disclosed herein in the preparation of a geopolymer cement (alkali activated cement) by adding sodium hydroxide, sodium silicate, sodium carbonate or combinations of thereof, results in surprisingly increasing the compressive strength of further derived products incorporating the same—mortar, grout, and/or concrete, by 5-40%, such as 5% to 33%, compared to equivalent conventional geopolymer mortar grout, and/or concrete, respectively, as measured at 1 day, 7 days, and 28 days.

In another aspect, the GACPM disclosed herein can also be co-ground with Portland cement clinker or blended with Portland cement, sand (fine aggregates), and water, to prepare an activated Portland slag cement mortar or grout (partially replacing a portion of Portland cement), wherein the Portland clinker and/or Portland cement to the GACPM are co-ground or blended, respectively, in a weight ratio of about 99:1 to 10:90% by weight. In another aspect, the GACPM disclosed herein can also be co-ground with Portland cement clinker or blended with Portland cement, sand (fine aggregates), coarse aggregates, and water, to prepare an activated Portland slag cement concrete (partially replacing a portion of Portland cement), wherein the Portland clinker and/or Portland cement to the GACPM are co-ground or blended, respectively, in a weight ratio of about 99:1 to 10:90% by weight.

In another aspect, when the GACPM disclosed herein is co-grounded with Portland cement clinker or blended with Portland cement, the resulting activated Portland slag cement mortar or grout has greater compressive strength, such as about 5-40% greater compressive strength, relative to a similar proportioned mortar grout mixture of (i) Portland cement, (ii) GGBFS, (3) sand (fine aggregates), and (4) water, as measured at 1 day, 7 days, and 28 days. In another aspect, when the GACPM disclosed herein is co-grounded with Portland cement clinker or blended with Portland cement, the resulting activated Portland slag cement concrete has greater compressive strength, such as about 5-40% greater compressive strength, relative to a similar proportioned concrete mixture of (i) Portland cement, (ii) GGBFS, (3) sand (fine aggregates), (4) coarse aggregates, and (5) water, as measured at 1 day, 7 days, and 28 days.

In another aspect, the use of the GACPM disclosed herein instead of GGBFS for geopolymer cement and their mortar, grout, or concrete derivatives, and/or the use of the GACPM disclosed herein instead of GGBFS in Portland cement/clinker, as co-ground or separate blending, and their mortar, grout, or concrete derivatives of Portland GACPM cement, can lower the grinding time, energy, cost, and/or carbon emissions due to less grinding time and higher compressive strength.

4. BRIEF DESCRIPTION OF THE DRAWINGS

Exemplary embodiments are described with the reference to the accompanying figures, in which:

FIG. 1 is a chart illustrating the effect of aluminum sulfate as a grinding aid on Blaine fineness over a grinding period ranging from 30 minutes to 4 hours, when co-ground with granulated slag (GBFS). The chart compares Ground Activated Cementitious Precursor Material (GACPM) samples containing 0.5%, 1.0%, and 1.5% aluminum sulfate with a control sample of granulated slag (GBFS) that was ground without any grinding aid. This comparison highlights the impact of varying concentrations of aluminum sulfate on the fineness achieved within the same grinding duration. For example, to achieve a fineness of 400 $m^2$/kg (Blaine), the granulated slag required 195 minutes of grinding without any grinding additive. However, using GACPM with 1% aluminum sulfate, as a grinding aid, reduced the grinding time to just 115 minutes to reach the same 400 $m^2$/kg fineness.

Figure 2:
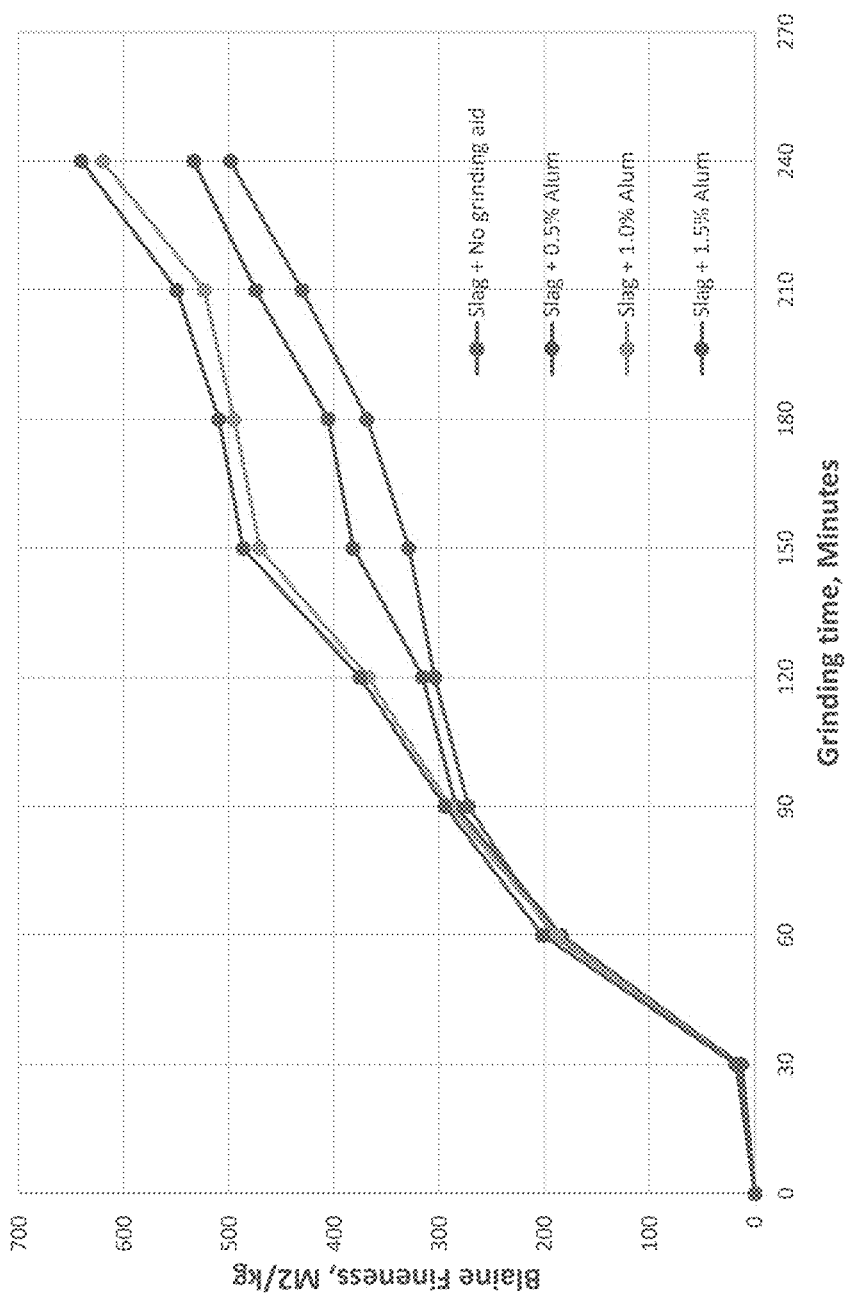

FIG. 2 is a chart illustrating the effect of Alum as a grinding aid on Blaine fineness over a grinding period ranging from 30 minutes to 4 hours, when co-ground with granulated slag (GBFS). The chart compares Ground Activated Cementitious Material (GACPM) samples containing 0.5%, 1.0%, and 1.5% Alum with a control sample of granulated slag (GBFS) that was ground without any grinding aid. This comparison highlights the impact of varying concentrations of Alum on the fineness achieved within the same grinding duration. For example, to achieve a fineness of 400 $m^2$/kg (Blaine), the granulated slag required 195 minutes of grinding without any grinding additive. However, using GACPM with 1% Alum, as a grinding aid, reduced the grinding time to just 125 minutes to reach the same 400 $m^2$/kg fineness.

5. DETAILED DESCRIPTION

As used herein, the singular forms "a", "an", and "the" are intended to include the plural forms as well, unless the context clearly indicates otherwise. It is also to be understood that the term "and/or" as used herein refers to and encompasses any and all possible combinations of one or more associated listed items. It is further to be understood that the terms "includes", "including", "comprises" and/or "comprising" when used herein specify the presence of stated features, integers, steps, operations, elements. Components, and/or units but do not preclude the presence or addition of one or more other features, integers, steps, operations, elements, components, units, and/or groups thereof.

As used herein and unless otherwise specified, the terms "about" and "approximately," when used in connection with a numeric value or a range of values which is provided to characterize a feature, an amount, a percentage, or a measurement, e.g., percentage by weight, compressive strength; indicate that the value or range of values may deviate to an extent deemed reasonable to one of ordinary skill in the art while still describing the particular feature, amount, percentage, or measurement. For example, in particular embodiments, the terms "about" and "approximately," when used in this context and unless otherwise specified, indicate that the numeric value or range of values may vary within 25%, 20%, 15%, 10%, 9%, 8%, 7%, 6%, 5%, 4%, 3%, 2%, 1.5%, 1%, 0.5%, or 0.25% of the recited value or range of values.

As used herein and unless otherwise specified, the term "granulated slag" is understood to refer to "unground, granulated slag." For example, Granulated Blast Furnace Slag (GBFS) is a by-product of iron and steel making industries, which is obtained by quenching molten iron slag from a blast furnace in water or steam, to produce a glassy, granular product that is then dried. In contrast, Ground Granulated Blast Furnace Slag (GGBFS) is the product that results from grinding GBFS into a fine powder of a required fineness.

As used herein and unless otherwise specified, the term "sand" refers to fine aggregates.

As used herein and unless otherwise specified, the term "coarse aggregates" is understood to include stone.

The compositions disclosed in U.S. Pat. No. 11,168,028 ("the '028 patent") were prepared in order to improve the rheological properties of cement materials (i.e. increase the working time, placing time, pot life, flowability, flow retention of mortar, and slump retention of concrete). In particular, conventional, ground, granulated slag, such as Ground Granulated Blast Furnace Slag (GGBFS), was blended together with pozzolanic material, an alkali activator (such as sodium silicate, sodium hydroxide or sodium carbonate), and a chemical additive (such as a sulfate or selenate compound), to improve working times for the resulting mortar or concrete compositions when ultimately combined with sand or sand and aggregate, respectively.

The grinding aid disclosed herein reduces the grinding time necessary to grind granulated slag, optionally with or without pozzolanic material, to prepare the resulting product, Ground Activated Cementitious Precursor Material (GACPM). GACPM is more reactive than GGBFS, which is prepared by grinding granulated slag without the use of a grinding aid.

In some embodiments, the GACPM comprises a combination of granulated slag (i.e., unground, granulated slag), a grinding aid, and optionally pozzolanic material, which are ground together. In some embodiments, the GACPM is exclusive of an alkali activator. In some embodiments, the GACPM is prepared by grinding together a combination of granulated slag (i.e., unground, granulated slag), a grinding aid, and optionally pozzolanic material, wherein the combination is exclusive of an alkali activator.

In some embodiments, the granulated slag is present in the GACPM at a weight percentage of between about 50-99.9% by weight, such as between about 75-99.9%, 80-99.9%, 80-99.9%, 85-99.9%, 90-99.9%, 95-99.9%, 97.5-99.9%, 98-99.9%, or 99-99.9% by weight, for example, at a weight percentage of at least 50%, 60%, 70%, 75%, 80%, 85%, 90%, 95%, 97%, 98, or 99% by weight. In some embodiments, the granulated slag is or comprises granulated blast furnace slag (GBFS), or any other unground metallurgical slag such as granulated pig iron slag, granulated steel furnace slag, granulated basic oxygen furnace slag, granulated electric arc furnace slag, or a combination thereof.

In some embodiments, the grinding aid is present in the GACPM at a weight percentage of between about 0.1-10% by weight, such as between about 0.1-9%, 0.1-8%, 0.1-7%, 0.1-6%, 0.1-5%, 0.1-4%, 0.1-3%, 0.1-2%, 0.25-1.75%, 0.5-1.5%, 1-5%, 5-10%, or 3-8% by weight, for example, at a weight percentage of about 0.5%, 1.0%, 1.5%, 2.0%, 2.5%, 3.0%, 4.5%, 5.0%, 5.5%, 6.0%, 6.5%, 7.0%, 7.5%, 8.0%, 8.5%, 9.0%, or 9.5% by weight. In some embodiments, the grinding aid is or comprises:
  i) Aluminum sulfate with a formula: $Al_2(SO_4)_3 \cdot nH_2O$, wherein n is 0-18, preferably wherein n is 12; and/or
  ii) Alum with a formula: $AB(SO_4)X \cdot nH_2O$, wherein A is K (potassium), Na (sodium), or NH4 (ammonium); B is Al (aluminum), Cr (chromium), Fe (iron), or Co (cobalt); x is 2-4, preferably 2; and n is 0-18, preferably 12; and/or
  iii) Na salt, K salt, or Li salt of a hydroxycarboxylic acid, wherein the hydroxycarboxylic acid comprises citric, lactic, glycolic, tartaric, acetic, or malic acid;
or a combination of thereof.

In some embodiments, the grinding aid is or comprises Aluminum sulfate. In some embodiments, the grinding aid is or comprises Alum. In some embodiments, the grinding aid is or comprises a Na salt, K salt, or Li salt of a hydroxycarboxylic acid, such as the Na salt, K salt, or Li salt of citric acid, the Na salt, K salt, or Li salt of lactic acid, the Na salt, K salt, or Li salt of glycolic acid, the Na salt, K salt, or Li salt of tartaric acid, the Na salt, K salt, or Li salt of acetic acid, and/or the Na salt, K salt, or Li salt of malic acid. In some embodiments, the grinding aid can be hydroxycarboxylic acids including but not limited to citric, lactic, glycolic, acetic, tartaric and malic acid neutralized with Na, K, Li hydroxides or carbonates. For example, the grinding aid can be Sodium lactate liquid or potassium lactate liquid. In some embodiments, the liquid grinding aid (e.g., sodium lactate liquid or potassium lactate liquid) can have 20 to 60% solid contents.

In some embodiments, the grinding aid is or comprises Aluminum sulfate which is incorporated in the GACPM in an amount of 0.1-10% by weight, such as 0.2-5% or 0.5-1.5% by weight.

In some embodiments, the grinding aid is or comprises Alum which is incorporated in the GACPM in an amount of 0.1-10% by weight, such as 0.2-5% or 0.5-1.5% by weight.

In some embodiments, the grinding aid is or comprises a mixture of sodium lactate liquid (20 to 60% solid) which is incorporated in the GACPM in an amount of 0.1-10% by weight (liquid weight percentage), such as 0.2-5% or 0.5-1.5% by weight (liquid weight percentage).

In some embodiments, the optional pozzolanic material is absent in the GACPM.

In some embodiments, the optional pozzolanic material is present in the GACPM. In some embodiments, the pozzolanic material is present in the ground precursor activated cementitious precursor material at a weight percentage of between about 0-50% by weight, such as between about 0-45%, 0-40%, 0-35%, 0-30%, 0-25%, 0-20%, 0-15%, 0-10%, 0-5%, 5-25%, 10-20%, or 10-15%, by weight, for example, at a weight percentage of at least 1%, 5%, 10%, 15%, 20%, 25%, 30%, 35%, 40%, or 45% by weight, or at a weight percentage of about 10%, 12%, 15%, 20%, or 25% by weight. In some embodiments, the pozzolanic material is or comprises fly ash, bottom ash, calcined clay, volcanic ash, pumice, silica fume, other alumino-silica glass, or combination thereof, such as F fly ash, Class C fly ash, silica fume, natural pozzolana, glass, calcined clay, or mixtures thereof. In some embodiments, the pozzolanic material is or comprises ASTM class F fly ash or ASTM C class C fly ash or combination of thereof.

In some embodiments, the components used to prepare the GACPM disclosed herein, comprising a mixture of granulated slag(unground), a grinding aid, and optionally, pozzolanic material, are ground together to form the GACPM, wherein the resulting GACPM has a Blaine fineness of 100-1000 $m^2/kg$, such as a Blaine fineness of between about 150-1000, 200-1000, 250-1000, 300-1000, 350-1000, 400-1000, 450-1000, 500-1000, 550-1000, 600-1000, 650-1000, 700-1000, 750-1000, 800-1000, 850-1000, 900-1000, 950-1000, 100-300, 300-750, 400-800, 400-750, 450-700, or 500-1000 $m^2/kg$, for example a Blaine fineness of at least 200, 300, 400, 450, 500, 600, 700, 800 or 900 $m^2/kg$. In some embodiments, the GACPM has a Blaine fineness of 200-800 $m^2/kg$ or 300-600 $m^2/kg$. In some embodiments, the Blaine fineness ($m^2/kg$) is measured using a Blaine Air Permeability apparatus according to ASTM C204 standards.

In some embodiments, raw materials of a ground activated cementitious precursor material (GACPM), comprise a mixture of: (a) unground granulated slag; and (b) a grinding aid; and (c) optionally, pozzolanic material.

In some embodiments, a ground activated cementitious precursor material (GACPM), comprises a mixture of raw materials comprising: (a) unground granulated slag; and (b) a grinding aid; and (c) optionally, pozzolanic material, which are ground together to achieve a Blaine fineness of 100-1000 $m^2/kg$.

Grinding GBFS requires a substantial amount of energy, costs, and generates significant carbon emissions. For instance, to achieve a fineness of 400 to 500 $m^2/kg$ for GGBFS via grinding GBFS typically requires about 40 to 50 kWh/ton energy, resulting in approximately 8 to 10 kg/ton of carbon emissions and costing about US$6 to 7 per ton. In some embodiments, the grinding aids disclosed here enhance the grinding efficiency, reducing the grinding time of preparing GACPM by between about 10-50%, such as by 10-33%, compared to the time period required to achieve the same Blaine fineness from grinding a mixture of granulated slag, and optionally pozzolanic material, ground in the absence of the grinding aid. This efficiency translates into between about 10-50%, such as about 5-33% savings in cost and carbon emissions. Additionally, for a fixed grinding time, the use of the grinding aids disclosed herein can improve the Blaine fineness of GACPM by about 10-50%, such as about 10-33%.

In particular, in some embodiments, a method of preparing GACPM is provided herein, wherein the method comprises grinding for a period of time a mixture comprising (a) unground, granulated slag, (b) a grinding aid, and (c) optionally, pozzolanic material; wherein the ground activated cementitious precursor material has a Blaine fineness of between about 100-1000 $m^2$/kg. In some embodiments, the mixture ground to prepare the GACPM is exclusive of an alkali activator. Grinding time is a significant variable influenced by factors such as the type of grinding mill, the size and quantity of grinding balls, the amount of material being ground, and the mill's RPM. In some embodiments, the mixture to prepare the GACPM is ground using a laboratory-scale grinding mill with three different ball sizes, a fixed quantity of balls, and a standardized RPM. In some embodiments, the mixture to prepare the GACPM is ground at a processing site with a concrete mixture machine or at a ready mixed concrete plant. While grinding time may vary when using different mills or setups, the percentage of time saved remains consistent with the use of our grinding aid. For example, in some embodiments, the grinding period of time is between about 60-270 minutes, such as between about 90-270, 90-240, 120-240, 180-240, 210-240, 120-240, 150-240, 180-240, or 210-240 minutes, for example, the grinding period of time is at least 90, 120, 150, 180, 210 or 240 minutes. In some embodiments, the Blaine fineness ($m^2$/kg) is measured using a Blaine Air Permeability apparatus according to ASTM C204 standards.

In some embodiments, the Blaine fineness of the GACPM is finer relative to a Blaine fineness resulting from grinding a mixture of (a) granulated slag and (c) optionally, pozzolanic material, for said period of time in the absence of grinding aid (b). In some embodiments, the Blaine fineness of the GACPM is between about 10-50% finer relative to a Blaine fineness resulting from grinding a mixture of (a) granulated slag and (c) optionally, pozzolanic material, for the period of time in the absence of grinding aid (b). For example, in some embodiments, the Blaine fineness of the GACPM is between about 15-50%, 20-50%, 25-50%, 30-50%, 35-50%, 40-50%, 45-50%, 15-30%, 15-40%, or 20-35% finer, such as at least 15%, 20%, 25%, 30%, 35%, 40%, or 45% finer, relative to a Blaine fineness resulting from grinding a mixture of (a) granulated slag and (c) optionally, pozzolanic material, for the period of time in the absence of grinding aid (b).

In some embodiments, the grinding aid reduces the period of time necessary to achieve the Blaine fineness of the GACPM relative to the time period required to achieve the same Blaine fineness from grinding a mixture of (a) granulated slag and (c) optionally, pozzolanic material, in the absence of grinding aid (b). In some embodiments, the period of time necessary to achieve the Blaine fineness of the GACPM is reduced by between about 10-50% relative to the time period required to achieve the same Blaine fineness from grinding a mixture of (a) granulated slag and (c) optionally, pozzolanic material, in the absence of grinding aid (b). For example, in some embodiments, the period of time necessary to achieve the Blaine fineness of the GACPM is reduced by between about 15-50%, 20-50%, 25-50%, 30-50%, 35-50%, 40-50%, 45-50%, 15-30%, 15-40%, or 20-35%, such as reduced by at least 15%, 20%, 25%, 30%, 35%, 40%, or 45%, relative to the time period required to achieve the same Blaine fineness from grinding a mixture of (a) granulated slag and (c) optionally, pozzolanic material, in the absence of grinding aid (b).

In some embodiments, the grinding aid reduces the amount of carbon emissions produced over the period of time necessary to achieve the Blaine fineness of the GACPM relative to the amount of carbon emissions produced over the same time period required to achieve the same Blaine fineness from grinding a mixture of (a) granulated slag and (c) optionally, pozzolanic material, in the absence of grinding aid (b). In some embodiments, the amount of carbon emissions produced over the period of time necessary to achieve the Blaine fineness of the GACPM is reduced by between about 10-50% relative to the same time period required to achieve the same Blaine fineness from grinding a mixture of (a) granulated slag and (c) optionally, pozzolanic material, in the absence of grinding aid (b). For example, in some embodiments, the amount of carbon emissions produced over the period of time necessary to achieve the Blaine fineness of the GACPM is reduced by between about 15-50%, 20-50%, 25-50%, 30-50%, 35-50%, 40-50%, 45-50%, 15-30%, 15-40%, or 20-35%, such as reduced by at least 15%, 20%, 25%, 30%, 35%, 40%, or 45%, relative to the same time period required to achieve the same Blaine fineness from grinding a mixture of (a) granulated slag and (c) optionally, pozzolanic material, in the absence of grinding aid (b).

In some embodiments, grinding GBFS in the absence of a grinding aid produced a GGBFS having a Blaine fineness of 499 $m^2$/kg after 4 hours of grinding. In contrast, using a grinding aid, such as 1% aluminum sulfate, increased the fineness of the resulting GACPM to 651 $m^2$/kg in the same 4-hour period, representing a 30.5% improvement in Blaine fineness. In another embodiment, without a grinding aid, it took 4 hours to produce a GGBFS having a fineness of 500 $m^2$/kg, while adding a grinding aid, such as 1% aluminum sulfate, reduced the time to just 3 hours to reach a fineness of the resulting GACPM of 530 $m^2$/kg, thus shortening the grinding time by 33%.

In some embodiments, an activated geopolymer cement can be made blending a mixture of GACPM, and one or more alkali activators. In some embodiments, the one or more alkali activators comprises sodium hydroxide, potassium hydroxide, sodium silicate, potassium silicate, sodium carbonate, or potassium carbonate, or a combination thereof. In some embodiments, the one or more alkali activators is present in the activated geopolymer cement at a weight percentage of between about 0.5-10% by weight, such as between about 0.5-9%, 0.5-8%, 1-9%, 1-8%, 1-5%, 3-10%, 3-8%, 5-10%, by weight, for example, at a weight percentage of at least 0.5%, 1%, 3%, 4%, 5%, 8%, or 9% by weight. In some embodiments, the one or more alkali activators is or comprises sodium and/or potassium hydroxide and is present in the activated geopolymer cement at a weight percentage of between about 0.5-10%, 0.5-8%, 1-6%, 1-5%, 1-4%, 1-3%, 2-5%, 3-5%, 6-10%, or 7-9% by weight, preferably between about 0.5-8% by weight; optionally the one or more alkali activators is or comprises sodium and/or potassium hydroxide and is present in the activated geopolymer cement at a weight percentage of about 1%, 2%, 3%, 4%, 5%, 6%, 7%, 8%, 9%, or 10% by weight, preferably about 1-5% by weight, preferably about 3%, 4%, or 5% by weight. In some embodiments, the one or more alkali activators is or comprises sodium and/or potassium silicate and/or sodium and/or potassium carbonate and is present in the activated geopolymer cement at a weight percentage of between about 0.5-10%, 0.5-8%, 1-6%, 1-5%, 1-4%, 1-3%, 2-5%, 3-5%, 6-10%, or 7-9% by weight, preferably between about 1-10% by weight; optionally the one or more alkali activators is or comprises sodium and/or potassium silicate and/or sodium and/or potassium carbonate and is present in the activated geopolymer cement at a weight percentage of about 1%, 2%, 3%, 4%, 5%, 6%, 7%, 8%, 9%, or 10% by weight, preferably about 1-5% by weight, preferably about 3%, 4%, or 5% by weight.

In some embodiments, the activated geopolymer cement may comprise a combination of components with the following weight percentages: GACPM in an amount of 80 to 97% by weight, sodium/potassium hydroxide in an amount of 1 to 12% by weight, and sodium/potassium silicate or sodium/potassium carbonate in an amount of 1 to 12% by weight.

In some embodiments, the grinding aid improves the Blaine fineness of the ground activated cementitious material by 10% to 33% for the same grinding time. In some embodiments, the grinding aid reduces the grinding time of the ground activated cementitious material by 10% to 33% for achieving similar Blaine fineness.

In some embodiments, the GACPM as disclosed herein is prepared by grinding a mixture of: (a) granulated slag (i.e., unground granulated slag); and (b) a grinding aid; and (c) optionally, pozzolanic material.

In some embodiments, the GACPM can be used in geopolymer alkali-activated cements, geopolymer mortars, and geopolymer concrete, in combination with one or more alkali activators disclosed herein, such as sodium hydroxide, sodium silicate, sodium carbonate, or combinations thereof, wherein the sodium hydroxide is present in an amount ranging from 0.5% to 8% by weight, and the sodium silicate and/or sodium carbonate is present in an amount ranging from 1% to 10% by weight of the ground activated cementitious material.

In some embodiments, the GACPM can be used as partial replacement of Portland clinker through co-grinding with a proportion of Portland clinker to GACPM ranging from 95:5 to 10:90 for use in Portland cement derivatives, mortar, grout, or concrete.

In some embodiments, the GACPM can be used as partial replacement of Portland cement through blending with a proportion of Portland cement to GACPM ranging from 95:5 to 10:90 for use in Portland cement derivatives, mortar, grout, or concrete.

In some embodiments, activated geopolymer mortar or grout exclusive of Portland clinker or Portland cement can be made by a combination of GACPM, alkali activators, sand (fine aggregates), and water. In some embodiments, the activated geopolymer mortar or grout disclosed herein has about 1 part cement to about 1-8 parts sand, with a water-to-cement (W/C) weight ratio of about 0.2-0.8. In some embodiments, the activated geopolymer mortar or grout has about 1 part cement to about 1-3 or 2-5 parts sand, with a water-to-cement (W/C) weight ratio of about 0.2-0.8. In some embodiments, the activated geopolymer mortar or grout has about 1 part cement to about 2-3 parts sand, with a water-to-cement (W/C) weight ratio of about 0.2-0.8. In some embodiments, the activated geopolymer mortar or grout has about 1 part cement to about 1, 1.5, 2, 2.5, 3, 3.5, 4, 4.5, 5, 5.5, 6, 6.5, 7, 7.5, or 8 parts sand. In some embodiments, the water-to-cement (W/C) weight ratio is about 0.2-0.6, 0.2-0.5, 0.2-0.4, 0.2-0.3, 0.3-0.6, 0.3-0.5, 0.3-0.4, 0.4-0.6, 0.4-0.5, 0.5-0.6, or 0.5-0.8, such as about 0.3-0.6, for example, about 0.2, 0.25, 0.3, 0.35, 0.4, 0.45, 0.5, 0.55, 0.6, 0.65, 0.7, 0.75, or 0.8. In some embodiments, the activated geopolymer mortar or grout has about 1 part cement to about 2 parts sand, with a water-to-cement (W/C) weight ratio of about 0.35. In some embodiments, the sand is ASTM C33 sand.

In some embodiments, the activated geopolymer mortar or grout has greater compressive strength relative to conventional geopolymer mortar, as measured at 1 day, 7 days, and 28 days. For example, in some embodiments, the activated geopolymer mortar or grout has between about 5-40% greater, such as about 5-33% greater, compressive strength relative to conventional geopolymer mortar, as measured at 1 day, 7 days, and 28 days. In some embodiments, the activated geopolymer mortar or grout has between about 5-35%, 5-33%, 5-30%, 5-25%, 5-20%, 5-15%, 5-10%, 10-40%, 10-35%, 10-33%, 10-30%, 10-25%, 10-20%, 10-15%, 15-40%, 15-35%, 15-33%, 15-30%, 15-25%, 15-20%, 20-40%, 20-35%, 20-33%, 20-30%, 20-25%, 25-40%, 25-35%, 25-33%, 25-30%, 30-40%, 30-35%, or 35-40% greater compressive strength, such as about 5%, 10%, 15%, 20%, 25%, 30%, 33%, 35%, or 40% greater compressive strength, relative to conventional geopolymer mortar, as measured at 1 day, 7 days, and 28 days.

In some embodiments, activated geopolymer concrete exclusive of Portland clinker or Portland cement can be made by a combination of GACPM, alkali activators, sand (fine aggregate), coarse aggregates, and water, at site with a concrete mixture machine or at a ready mixed concrete plant. In some embodiments, the activated geopolymer concrete can be mix designed as per American Concrete Institute (ACI) concrete mix design method, ACI 211: Standard Practice for Selecting Proportions for Normal, Heavyweight, and Mass Concrete with an activated geopolymer range of 200 kg/m$^3$ to 500 kg/m$^3$ to achieve 28 days compressive strength 15 to 70 MPa, replacing GGBFS with the GAPCM as disclosed herein.

In some embodiments, an activated Portland slag cement is provided, comprising a blended mixture of Portland cement and the GACPM as disclosed herein. In some embodiments, an activated Portland slag cement is provided, comprising a ground (grinded) mixture of Portland clinker and the GACPM as disclosed herein.

In some embodiments, an activated Portland slag cement mortar or grout is provided, comprising a blended mixture of: i) Portland cement; ii) the GACPM as disclosed herein; iii) sand (fine aggregates); and iv) water; wherein the Portland cement to the GACPM as disclosed herein are blended in a weight ratio of about 99:1 to about 10:90; optionally about 95:5 to about 10:90. In some embodiments, an activated Portland slag cement mortar or grout is provided, comprising a ground (grinded) mixture of: i) Portland clinker; ii) the GACPM as disclosed herein; iii) sand (fine aggregates); and iv) water; wherein the Portland clinker to the GACPM as disclosed herein are ground in a weight ratio of about 99:1 to about 10:90; optionally about 95:5 to about 10:90. In some embodiments, the activated Portland slag cement mortar or grout has about 1 part cement to about 1-8 parts sand, with a water-to-cement (W/C) weight ratio of about 0.2-0.8. For example, in some embodiments, the activated Portland slag cement mortar or grout has about 1 part cement to about 1-3 parts sand, with a water-to-cement (W/C) weight ratio of about 0.2-0.8, such as about 1 part cement to about 2-3 parts sand or about 2-5 parts sand, with a water-to-cement (W/C) weight ratio of about 0.2-0.8. In some embodiments, the activated Portland slag cement mortar or grout has about 1 part cement to about 1, 1.5, 2, 2.5, 3, 3.5, 4, 4.5, 5, 5.5, 6, 6.5, 7, 7.5, or 8 parts sand. In some embodiments, the water-to-cement (W/C) weight ratio is about 0.2-0.6, 0.2-0.5, 0.2-0.4, 0.2-0.3, 0.3-0.6, 0.3-0.5, 0.3-0.4, 0.4-0.6, 0.4-0.5, 0.5-0.6, or 0.5-0.8, such as about 0.3-0.6. In some embodiments, the water-to-cement (W/C) weight ratio is about 0.2, 0.25, 0.3, 0.35, 0.4, 0.45, 0.5, 0.55, 0.6, 0.65, 0.7, 0.75, or 0.8. In some embodiments, the activated Portland slag cement mortar or grout has about 1 part cement to about 2.75 parts sand, with a water-to-cement (W/C) weight ratio of about 0.48. In some embodiments, the sand is ASTM C33 sand.

In some embodiments, the activated Portland slag cement mortar or grout has greater compressive strength relative to a similar proportioned mortar grout mixture of (i) Portland cement, (ii) GGBFS, (3) sand, and (4) water, as measured at 1 day, 7 days, and 28 days. In some embodiments, the activated Portland slag cement mortar or grout has between about 5-40% greater, such as about 5-33% greater, compressive strength relative to a similar proportioned mortar grout mixture of (i) Portland cement, (ii) GGBFS, (3) sand, and (4) water, as measured at 1 day, 7 days, and 28 days. In some embodiments, the activated Portland slag cement mortar or grout has between about 5-35%, 5-33%, 5-30%, 5-25%, 5-20%, 5-15%, 5-10%, 10-40%, 10-35%, 10-33%, 10-30%, 10-25%, 10-20%, 10-15%, 15-40%, 15-35%, 15-33%, 15-30%, 15-25%, 15-20%, 20-40%, 20-35%, 20-33%, 20-30%, 20-25%, 25-40%, 25-35%, 25-33%, 25-30%, 30-40%, 30-35%, or 35-40% greater compressive strength relative to a similar proportioned mortar grout mixture of (i) Portland cement, (ii) GGBFS, (3) sand, and (4) water, as measured at 1 day, 7 days, and 28 days. In some embodiments, the activated Portland slag cement mortar or grout has about 5%, 10%, 15%, 20%, 25%, 30%, 33%, 35%, or 40% greater compressive strength relative to a similar proportioned mortar grout mixture of (i) Portland cement, (ii) GGBFS, (3) sand, and (4) water, as measured at 1 day, 7 days, and 28 days.

In some embodiments, an activated Portland slag cement concrete is provided, comprising a blended mixture of: i) Portland cement; ii) the GACPM as disclosed herein; iii) sand (fine aggregate); iv) coarse aggregates; and v) water; wherein the Portland cement to the GACPM are blended together in a weight ratio of about 99:1 to about 10:90; optionally about 95:5 to about 10:90. In some embodiments, an activated Portland slag cement concrete, comprising a ground mixture of: i) Portland clinker; ii) the GACPM as disclosed herein; iii) sand (fine aggregate); iv) coarse aggregates; and v) water; wherein the Portland clinker to the GACPM are ground together in a weight ratio of about 99:1 to about 10:90; optionally about 95:5 to about 10:90. In some embodiments, the activated Portland slag cement concrete is mix designed according to ACI 211 (American concrete Institute) with an activated Portland slag cement content 200-500 kg/m$^3$ and slump of 0-25 cm for targeted 28 days strength of 15-60 MPa, optionally 20-60 MPa, replacing GGBFS with the GAPCM as disclosed herein. In some embodiments, the sand is ASTM C33 sand (fine aggregate). In some embodiments, the coarse aggregates is with any grading of ASTM C 33 (see Table 2). In some embodiments, the activated Portland slag cement concrete has greater compressive strength relative to a similar proportioned concrete mixture of (i) Portland cement, (ii) GGBFS, (3) sand (fine aggregate), (4) coarse aggregates, and (5) water, as measured at 1 day, 7 days, and 28 days. In some embodiments, the activated Portland slag cement concrete has between about 5-40% greater, such as about 5-33% greater, compressive strength relative to a similar proportioned concrete mixture of (i) Portland cement, (ii) GGBFS, (3) sand (fine aggregate), (4) coarse aggregates, and (5) water, as measured at 1 day, 7 days, and 28 days. In some embodiments, the activated Portland slag cement concrete has between about 5-35%, 5-33%, 5-30%, 5-25%, 5-20%, 5-15%, 5-10%, 10-40%, 10-35%, 10-33%, 10-30%, 10-25%, 10-20%, 10-15%, 15-40%, 15-35%, 15-33%, 15-30%, 15-25%, 15-20%, 20-40%, 20-35%, 20-33%, 20-30%, 20-25%, 25-40%, 25-35%, 25-33%, 25-30%, 30-40%, 30-35%, or 35-40% greater compressive strength relative to a similar proportioned concrete mixture of (i) Portland cement, (ii) GGBFS, (3) sand (fine aggregate), (4) coarse aggregates, and (5) water, as measured at 1 day, 7 days, and 28 days. In some embodiments, the activated Portland slag cement concrete has about 5%, 10%, 15%, 20%, 25%, 30%, 33%, 35%, or 40% greater compressive strength relative to a similar proportioned concrete mixture of (i) Portland cement, (ii) GGBFS, (3) sand (sand), (4) coarse aggregates, and (5) water, as measured at 1 day, 7 days, and 28 days.

In some embodiments, the activated geopolymer concrete has greater compressive strength relative to conventional geopolymer concrete at a similar cement level, as measured at 1 day, 7 days, and 28 days. In some embodiments, the activated geopolymer concrete has between about 5-40% greater, such as about 5-33% greater, compressive strength relative to conventional geopolymer concrete at a similar cement level, as measured at 1 day, 7 days, and 28 days. In some embodiments, the activated geopolymer concrete has between about 5-35%, 5-33%, 5-30%, 5-25%, 5-20%, 5-15%, 5-10%, 10-40%, 10-35%, 10-33%, 10-30%, 10-25%, 10-20%, 10-15%, 15-40%, 15-35%, 15-33%, 15-30%, 15-25%, 15-20%, 20-40%, 20-35%, 20-33%, 20-30%, 20-25%, 25-40%, 25-35%, 25-33%, 25-30%, 30-40%, 30-35%, or 35-40% greater compressive strength, such as about 5%, 10%, 15%, 20%, 25%, 30%, 33%, 35%, or 40% greater compressive strength, relative to conventional geopolymer concrete, as measured at 1 day, 7 days, and 28 days.

In some embodiments, conventional geopolymer mortar, such as a geopolymer mortar made with GGBFS prepared by grinding GBFS without the use of any grinding aid, achieved compressive strengths of 16.3 MPa at 1 day, 21.0 MPa at 3 days, 27.1 MPa at 7 days, and 42.4 MPa at 28 days. In comparison, in some embodiments, the activated geopolymer mortar disclosed herein, made with GACPM (for example, prepared by grinding granulated slag, such as GBFS, in the presence of a grinding aid in the weight percentage proportions of 99% granulated slag (e.g., GBFS), 0% pozzolanic materials, and 1% grinding aid (e.g., 1% aluminum sulfate), achieved compressive strengths of 18.7 MPa at 1 day, 25.2 MPa at 3 days, 33.1 MPa at 7 days, and 53.5 MPa at 28 days. The grinding aid improved the resulting compressive strengths of the activated geopolymer mortar by 14.72% at 1 day, 20% at 3 days, 22.1% at 7 days, and 26.2% at 28 days, relative to the conventional geopolymer mortar, as measured at 1 day, 7 days, and 28 days, respectively.

In some embodiments, conventional geopolymer concrete, such as a concrete made with geopolymer cement using GGBFS prepared by grinding GBFS without the use of any grinding aid, at a mix design of 280 kg/m$^3$ cement, 727 kg/m$^3$ fine aggregates, 1319 kg/m$^3$ coarse aggregates, and a 0.45 water-to-cement (W/C) ratio, achieved compressive strengths of 3.1 MPa at 1 day, 12.5 MPa at 3 days, 19.6 MPa at 7 days, and 27.5 MPa at 28 days. In comparison, in some embodiments, a similar mix design using GACPM (for example, prepared by grinding granulated slag, such as GBFS, in the presence of a grinding aid, such as with 1% aluminum sulfate as a grinding aid)) resulted in an activated geopolymer concrete having increased compressive strengths of 6.4 MPa at 1 day, 15.8 MPa at 3 days, 24.5 MPa at 7 days, and 36.1 MPa at 28 days, relative to the conventional geopolymer concrete, as measured at 1 day, 7 days, and 28 days, respectively.

In some embodiments, conventional geopolymer concrete, such as a concrete made with geopolymer cement using GGBFS prepared by grinding GBFS without the use of a grinding aid, with a mix design of 440 kg/m³ cement, 550.9 kg/m³ fine aggregates, 1319 kg/m³ coarse aggregates, and a 0.38 W/C ratio, achieved compressive strengths of 14.3 MPa at 1 day, 24.2 MPa at 3 days, 33.4 MPa at 7 days, and 44.2 MPa at 28 days. In comparison, in some embodiments, the same mix design made with the GACPM disclosed herein, such as GACPM prepared by grinding granulated slag, such as GBFS, in the presence of a grinding aid, such as 1% aluminum sulfate as a grinding aid, resulted in an activated geopolymer concrete having increased compressive strengths of 17.2 MPa at 1 day, 27.1 MPa at 3 days, 38.2 MPa at 7 days, and 51.0 MPa at 28 days, relative to the conventional geopolymer concrete, as measured at 1 day, 7 days, and 28 days, respectively.

In some embodiments, GACPM is blended with Portland cement, using GACPM as a partial replacement of Portland cement, to provide Activated Portland slag cement with a Portland cement to GACPM proportion 50:50%, 40:60%, and 30:70%, by weight.

In some embodiments, mortar made according to ASTM C109 with a 50:50 blend of Portland cement and ground blast furnace slag without any grinding aid (i.e., GGBFS) achieved compressive strengths of 2.6 MPa at 1 day, 12.3 MPa at 3 days, 23.0 MPa at 7 days, and 32.1 MPa at 28 days. In comparison, mortar made under the same conditions but with a 50:50 blend of Portland cement and GACPM (ground with 1% aluminum sulfate as a grinding aid) reached compressive strengths of 4.7 MPa at 1 day, 17.0 MPa at 3 days, 32.3 MPa at 7 days and 41.9 at 28 days.

6. EXEMPLARY EMBODIMENTS

One or more than one (including for instance all) of the following exemplary Embodiments may comprise each of the other embodiments or parts thereof.

A1. A ground activated cementitious precursor material (GACPM), comprising a ground mixture, such as a ground together mixture, of:
  (a) granulated slag (i.e., unground granulated slag); and
  (b) a grinding aid; and
  (c) optionally, pozzolanic material.

A2. The ground activated cementitious precursor material of embodiment A1, wherein the granulated slag comprises granulated blast furnace slag (GBFS), granulated pig iron slag, granulated steel furnace slag, granulated basic oxygen furnace slag, granulated electric arc furnace slag, or a combination thereof.

A3. The ground activated cementitious precursor material of embodiment A1 or embodiment A2, wherein the grinding aid comprises:
  i) Aluminum sulfate with a formula: $Al_2(SO_4)_3 \cdot nH_2O$, wherein n is 0-18, preferably wherein n is 12;
  ii) Alum with a formula: $AB(SO_4)_X \cdot nH_2O$, wherein A is K (potassium), Na (sodium), or $NH_4$ (ammonium); B is Al (aluminum), Cr (chromium), Fe (iron), or Co (cobalt); x is 2-4, preferably 2; and n is 0-18, preferably 12; and/or
  iii) Na salt, K salt, or Li salt of a hydroxycarboxylic acid, wherein the hydroxycarboxylic acid comprises citric, lactic, glycolic, tartaric, acetic, or malic acid;
or a combination of thereof.

A4. The ground activated cementitious precursor material of any one of embodiments A1-A3, wherein the grinding aid comprises a combination of the Aluminum sulfate and the Alum or the Aluminum sulfate and the Na salt, K salt, or Li salt of a hydroxycarboxylic acid.

A5. The ground activated cementitious precursor material of any one of embodiments A1-A3, wherein the grinding aid comprises a combination of the Alum and the Na salt, K salt, or Li salt of a hydroxycarboxylic acid.

A6. The ground activated cementitious precursor material of any one of embodiments A1-A5, wherein the granulated slag is present in the ground precursor activated cementitious precursor material at a weight percentage of between about 50-99.9% by weight.

A7. The ground activated cementitious precursor material of any one of embodiments A1-A6, wherein the granulated slag is present in the ground activated cementitious precursor material at a weight percentage of between about 75-99.9% by weight.

A8. The ground activated cementitious precursor material of any one of embodiments A1A7, wherein the granulated slag is present in the ground activated cementitious precursor material at a weight percentage of between about 80-99.9%, 80-99.9%, 85-99.9%, 90-99.9%, 95-99.9%, 97.5-99.9%, 98-99.9%, or 99-99.9% by weight.

A9. The ground activated cementitious precursor material of any one of embodiments A1-A8, wherein the granulated slag is present in the ground activated cementitious precursor material at a weight percentage of at least 50%, 60%, 70%, 75%, 80%, 85%, 90%, 95%, 97%, 98, or 99% by weight.

A10. The ground activated cementitious precursor material of any one of embodiments A1-A9, wherein the grinding aid is present in the ground precursor activated cementitious precursor material at a weight percentage of between about 0.1-10% by weight.

A11. The ground activated cementitious precursor material of any one of embodiments A1-A10, wherein the grinding aid is present in the ground activated cementitious precursor material at a weight percentage of between about 0.1-9%, 0.1-8%, 0.1-7%, 0.1-6%, 0.1-5%, 0.1-4%, 0.1-3%, 0.1-2%, 0.25-1.75%, 0.5-1.5%, 1-5%, 5-10%, or 3-8% by weight A12. The ground activated cementitious precursor material of any one of embodiments A1-A11, wherein the grinding aid is present in the ground activated cementitious precursor material at a weight percentage of about 0.5%, 1.0%, 1.5%, 2.0%, 2.5%, 3.0%, 4.5%, 5.0%, 5.5%, 6.0%, 6.5%, 7.0%, 7.5%, 8.0%, 8.5%, 9.0%, or 9.5% by weight.

A13. The ground activated cementitious precursor material of any one of embodiments A1-A12, wherein the grinding aid is or comprises Aluminum sulfate.

A14. The ground activated cementitious precursor material of any one of embodiments A1-A13, wherein the grinding aid is or comprises Alum.

A15. The ground activated cementitious precursor material of any one of embodiments A1-A14, wherein the grinding aid is or comprises Na salt, K salt, or Li salt of a hydroxycarboxylic acid.

A16. The ground activated cementitious precursor material of any one of embodiments A1-A15, wherein the grinding aid is or comprises Na salt, K salt, or Li salt of citric acid.

A17. The ground activated cementitious precursor material of any one of embodiments A1-A16, wherein the grinding aid is or comprises Na salt, K salt, or Li salt of lactic acid.

A18. The ground activated cementitious precursor material of any one of embodiments A1-A17, wherein the grinding aid is or comprises Na salt, K salt, or Li salt of glycolic acid.

A19. The ground activated cementitious precursor material of any one of embodiments A1-A18, wherein the grinding aid is or comprises Na salt, K salt, or Li salt of tartaric acid.

A20. The ground activated cementitious precursor material of any one of embodiments A1-A19, wherein the grinding aid is or comprises Na salt, K salt, or Li salt of acetic acid.

A21. The ground activated cementitious precursor material of any one of embodiments A1-A20, wherein the grinding aid is or comprises Na salt, K salt, or Li salt of malic acid.

A22. The ground activated cementitious precursor material of any one of embodiments A1-A21, wherein the ground activated cementitious precursor material is exclusive of the pozzolanic material (i.e., 0% by weight).

A23. The ground activated cementitious precursor material of any one of embodiments A1-A21, wherein the optional pozzolanic material is present in the ground activated cementitious precursor material; optionally wherein the pozzolanic material is present in the ground precursor activated cementitious precursor material at a weight percentage of between about 0-50% by weight, such as between about 0-45%, 0-40%, 0-35%, 0-30%, 0-25%, 0-20%, 0-15%, 0-10%, 0-5%, 5-25%, 10-20%, or 10-15%, by weight.

A24. The ground activated cementitious precursor material of embodiment A23, wherein the pozzolanic material is present in the ground activated cementitious precursor material at a weight percentage of greater than 0% by weight, such as at least 1%, 5%, 10%, 15%, 20%, 25%, 30%, 35%, 40%, or 45% by weight.

A25. The ground activated cementitious precursor material of any one of embodiments A22-A24, wherein the pozzolanic material is present in the ground activated cementitious precursor material at a weight percentage of about 10%, 12%, 15%, 20%, or 25% by weight.

A26. The ground activated cementitious precursor material of any one of embodiments A1-A25, wherein the pozzolanic material comprises F fly ash, Class C fly ash, silica fume, natural pozzolana, glass, calcined clay, or mixtures thereof.

A27. The ground activated cementitious precursor material of any one of embodiments A1-A26, wherein the ground precursor activated cementitious precursor material has a Blaine fineness of between about 100-1000 $m^2/kg$.

A28. The ground activated cementitious precursor material of embodiment A27, wherein the Blaine fineness of the ground precursor activated cementitious precursor material is between about 150-1000, 200-1000, 250-1000, 300-1000, 350-1000, 400-1000, 450-1000, 500-1000, 550-1000, 600-1000, 650-1000, 700-1000, 750-1000, 800-1000, 850-1000, 900-1000, 950-1000, 100-300, 300-750, 400-800, 400-750, 450-700, or 500-1000 $m^2/kg$.

A29. The ground activated cementitious precursor material of embodiment A26, wherein the Blaine fineness of the ground precursor activated cementitious precursor material is at least 200, 300, 400, 450, 500, 600, 700, 800 or 900 m2/kg.

A30. The ground activated cementitious precursor material of any one of embodiments A1-A29, wherein the Blaine fineness ($m^2/kg$) is measured using a Blaine Air Permeability apparatus according to ASTM C204 standards.

A31. The ground activated cementitious precursor material of any one of embodiments A1-A30, wherein the ground precursor activated cementitious precursor material is exclusive of an alkali activator.

A32. An activated geopolymer cement, comprising a blended mixture of the ground activated cementitious precursor material of any one of embodiments A1-A31 and one or more alkali activators; optionally wherein the blended is ground or mixed.

A33. The activated geopolymer cement of embodiment A32, wherein the one or more alkali activators comprises sodium hydroxide, sodium silicate, sodium carbonate, or a combination thereof.

A34. The activated geopolymer cement of embodiment A32 or embodiment A33, wherein the one or more alkali activators is present in the activated geopolymer cement at a weight percentage of between about 0.5-10% by weight.

A35. The activated geopolymer cement of any one of embodiments A32-A34, wherein the one or more alkali activators is present in the activated geopolymer cement at a weight percentage of between about 0.5-9%, 0.5-8%, 1-9%, 1-8%, 1-5%, 3-10%, 3-8%, 5-10%, by weight.

A36. The activated geopolymer cement of any one of embodiments A32-A35, wherein the one or more alkali activators is present in the activated geopolymer cement at a weight percentage of at least 0.5%, 1%, 3%, 4%, 5%, 8%, or 9% by weight.

A37. The activated geopolymer cement of any one of embodiments A32-A36, wherein the one or more alkali activators is or comprises sodium hydroxide and is present in the activated geopolymer cement at a weight percentage of between about 0.5-10%, 0.5-8%, 1-6%, 1-5%, 1-4%, 1-3%, 2-5%, 3-5%, 6-10%, or 7-9% by weight, preferably between about 0.5-8% by weight; optionally the one or more alkali activators is or comprises sodium hydroxide and is present in the activated geopolymer cement at a weight percentage of about 1%, 2%, 3%, 4%, 5%, 6%, 7%, 8%, 9%, or 10% by weight, preferably about 1-5% by weight, preferably about 3%, 4%, or 5% by weight.

A38. The activated geopolymer cement of any one of embodiments A32-A37, wherein the one or more alkali activators is or comprises sodium silicate and/or sodium carbonate and is present in the activated geopolymer cement at a weight percentage of between about 0.5-10%, 0.5-8%, 1-6%, 1-5%, 1-4%, 1-3%, 2-5%, 3-5%, 6-10%, or 7-9% by weight, preferably between about 1-10% by weight; optionally the one or more alkali activators is or comprises sodium silicate and/or sodium carbonate and is present in the activated geopolymer cement at a weight percentage of about 1%, 2%, 3%, 4%, 5%, 6%, 7%, 8%, 9%, or 10% by weight, preferably about 1-5% by weight, preferably about 3%, 4%, or 5% by weight.

A39. An activated geopolymer mortar or grout, comprising the activated geopolymer cement of any of embodiments A32-A38, sand, and water.

A40. The activated geopolymer mortar or grout of embodiment A39, wherein the activated geopolymer mortar or grout has about 1 parts cement to about 1-8 parts sand, with a water-to-cement (W/C) weight ratio of about 0.2-0.6.

A41. The activated geopolymer mortar or grout of embodiment A39 or A40, wherein the activated geopolymer mortar or grout has about 1 part cement to about 1-8 parts sand, with a water-to-cement (W/C) weight ratio of about 0.2-0.6.

A42. The activated geopolymer mortar or grout of embodiment A39 or A40, wherein the activated geopolymer mortar or grout has about 1 part cement to about 2-5 parts sand, such as about 2-4 parts sand or about 2-3 parts sand, with a water-to-cement (W/C) weight ratio of about 0.2-0.6.

A43. The activated geopolymer mortar or grout of embodiment A39 or A40, wherein the activated geopolymer mortar or grout has about 1 part cement to about 1, 2, 3, 4, or 5 parts sand.

A44. The activated geopolymer mortar or grout of any one of embodiments A39-A43, wherein the water-to-cement (W/C) weight ratio is about 0.2-0.5, 0.2-0.4, 0.2-0.3, 0.3-0.6, 0.3-0.5, 0.3-0.4, 0.4-0.6, 0.4-0.5, or 0.5-0.6.

A45. The activated geopolymer mortar or grout of embodiment A44, wherein the water-to-cement (W/C) weight ratio is about 0.3-0.5.

A46. The activated geopolymer mortar or grout of embodiment A44, wherein the water-to-cement (W/C) weight ratio is about 0.2, 0.25, 0.3, 0.35, 0.4, 0.45, 0.5, 0.55, or 0.6.

A47. The activated geopolymer mortar or grout of embodiment A39 or A40, wherein the activated geopolymer mortar or grout has about 1 part cement to about 2 parts sand, with a water-to-cement (W/C) weight ratio of about 0.35.

A48. The activated geopolymer mortar or grout of any one of embodiments A39-A47, wherein the sand is ASTM C33 sand.

A49. The activated geopolymer mortar or grout of any one of embodiments A39-A48, wherein the activated geopolymer mortar or grout has greater compressive strength relative to conventional geopolymer mortar, as measured at 1 day, 7 days, and 28 days.

A50. The activated geopolymer mortar or grout of any one of embodiments A39-A48, wherein the activated geopolymer mortar or grout has between about 5-40% greater, such as about 5-33% greater, compressive strength relative to conventional geopolymer mortar, as measured at 1 day, 7 days, and 28 days.

A51. The activated geopolymer mortar or grout of embodiment A50, wherein the activated geopolymer mortar or grout has between about 5-35%, 5-33%, 5-30%, 5-25%, 5-20%, 5-15%, 5-10%, 10-40%, 10-35%, 10-33%, 10-30%, 10-25%, 10-20%, 10-15%, 15-40%, 15-35%, 15-33%, 15-30%, 15-25%, 15-20%, 20-40%, 20-35%, 20-33%, 20-30%, 20-25%, 25-40%, 25-35%, 25-33%, 25-30%, 30-40%, 30-35%, or 35-40% greater compressive strength relative to conventional geopolymer mortar, as measured at 1 day, 7 days, and 28 days.

A52. The activated geopolymer mortar or grout of embodiment A50 or A51, wherein the activated geopolymer mortar or grout has about 5%, 10%, 15%, 20%, 25%, 30%, 33%, 35%, or 40% greater compressive strength relative to conventional geopolymer mortar, as measured at 1 day, 7 days, and 28 days.

A53. An activated geopolymer concrete, comprising the activated geopolymer cement of any of embodiments A32 to A38, sand (fine aggregate), coarse aggregates, and water.

A54. The activated geopolymer concrete of embodiment A53, wherein the activated geopolymer concrete is mix designed per ACI 211 (American concrete Institute) with an activated geopolymer cement content 200 kg/m$^3$ to 500 kg/m$^3$ and slump 0 cm to 25 cm for targeted 28 days strength of about 15 MPa to 60 MPa, replacing GGBFS with the GAPCM of any one of embodiments A1-A31.

A55. The activated geopolymer concrete of embodiment A53 or A54, wherein the 28 day compressive strength is about 20 MPa to 60 MPa.

A56. The activated geopolymer concrete of any one of embodiments A53-A55, wherein the sand is ASTM C33 sand.

A57. The activated geopolymer concrete of any one of embodiments A53-A56, wherein the coarse aggregates is ASTM C 33 coarse aggregates with any grading of ASTM C 33 (Table 2).

A58. The activated geopolymer concrete of any one of embodiments A53-A57, wherein the activated geopolymer concrete has greater compressive strength relative to conventional geopolymer concrete, as measured at 1 day, 7 days, and 28 days.

A59. The activated geopolymer concrete of embodiment A58, wherein the activated geopolymer concrete has between about 5-40% greater, such as about 5-33% greater, compressive strength relative to conventional geopolymer concrete, as measured at 1 day, 7 days, and 28 days.

A60. The activated geopolymer concrete of embodiment A58 or A59, wherein the activated geopolymer concrete has between about 5-35%, 5-33%, 5-30%, 5-25%, 5-20%, 5-15%, 5-10%, 10-40%, 10-35%, 10-33%, 10-30%, 10-25%, 10-20%, 10-15%, 15-40%, 15-35%, 15-33%, 15-30%, 15-25%, 15-20%, 20-40%, 20-35%, 20-33%, 20-30%, 20-25%, 25-40%, 25-35%, 25-33%, 25-30%, 30-40%, 30-35%, or 35-40% greater compressive strength relative to conventional geopolymer concrete, as measured at 1 day, 7 days, and 28 days.

A61. The activated geopolymer concrete of any one of embodiments A58-A60, wherein the activated geopolymer concrete has about 5%, 10%, 15%, 20%, 25%, 30%, 33%, 35%, or 40% greater compressive strength relative to conventional geopolymer concrete, as measured at 1 day, 7 days, and 28 days.

A62. The ground activated cementitious precursor material (GACPM) of any one of embodiments A1-A31, wherein the GACPM is prepared by grinding a mixture of:
　(a) granulated slag (i.e., unground granulated slag); and
　(b) a grinding aid; and
　(c) optionally, pozzolanic material.

A63-A67. BLANK.

A68. An activated Portland slag cement, comprising a blended mixture of:
　i) Portland cement; and
　ii) the GACPM of any one of embodiments A1 to A31.

A69. An activated Portland slag cement, comprising a ground mixture of:
　i) Portland clinker; and
　ii) the GACPM of any one of embodiments A1 to A31.

A70. An activated Portland slag cement mortar or grout comprising a blended mixture of:
　i) Portland cement;
　ii) the GACPM of any one of embodiments A1-A31;
　iii) sand (fine aggregates); and
　iv) water;
wherein the Portland cement to the GACPM of any one of embodiments A1-A31 are blended in a weight ratio of about 99:1 to about 10:90; optionally about 95:5 to about 10:90.

A71. An activated Portland slag cement mortar or grout comprising a ground mixture of:
　i) Portland clinker;
　ii) the GACPM of any one of embodiments A1-A31;
　iii) sand (fine aggregates); and
　iv) water;

wherein the Portland clinker to the GACPM of any one of embodiments A1-A31 are ground in a weight ratio of about 99:1 to about 10:90; optionally about 95:5 to about 10:90.

A72. The activated Portland slag cement mortar or grout of embodiment A71, wherein the activated Portland slag cement mortar or grout has about 1 part cement to about 1-8 parts sand, with a water-to-cement (W/C) weight ratio of about 0.2-0.8.

A73. The activated Portland slag cement mortar or grout of embodiment A72, wherein the activated Portland slag cement mortar or grout has about 1 part cement to about 1-3 parts sand, with a water-to-cement (W/C) weight ratio of about 0.2-0.8.

A74. The activated Portland slag cement mortar or grout of embodiment A72, wherein the activated Portland slag cement mortar or grout has about 1 part cement to about 2-3 parts sand or about 2-5 parts sand, with a water-to-cement (W/C) weight ratio of about 0.2-0.8.

A75. The activated Portland slag cement mortar or grout of embodiment A72, wherein the activated Portland slag cement mortar or grout has about 1 part cement to about 1, 1.5, 2, 2.5, 3, 3.5, 4, 4.5, 5, 5.5, 6, 6.5, 7, 7.5, or 8 parts sand.

A76. The activated Portland slag cement mortar or grout of any of embodiments A71-A75, wherein the water-to-cement (W/C) weight ratio is about 0.2-0.6, 0.2-0.5, 0.2-0.4, 0.2-0.3, 0.3-0.6, 0.3-0.5, 0.3-0.4, 0.4-0.6, 0.4-0.5, 0.5-0.6, or 0.5-0.8.

A77. The activated Portland slag cement mortar or grout of embodiment A76, wherein the water-to-cement (W/C) weight ratio is about 0.3-0.6.

A78. The activated Portland slag cement mortar or grout of embodiment A76, wherein the water-to-cement (W/C) weight ratio is about 0.2, 0.25, 0.3, 0.35, 0.4, 0.45, 0.5, 0.55, 0.6, 0.65, 0.7, 0.75, or 0.8.

A79. The activated Portland slag cement mortar or grout of embodiment A71 or embodiment A72, wherein the activated Portland slag cement mortar or grout has about 1 part cement to about 2.75 parts sand, with a water-to-cement (W/C) weight ratio of about 0.48.

A80. The activated Portland slag cement mortar or grout of any of embodiments A71-A79, wherein the sand is ASTM C33 sand.

A81: An activated Portland slag cement concrete, comprising a blended mixture of:
  i) Portland cement;
  ii) the GACPM any one of embodiments A1-A31;
  iii) sand (fine aggregate);
  iv) coarse aggregates; and
  v) water;
wherein the Portland cement to the GACPM of any one of embodiments A1-A31 are blended together in a weight ratio of about 99:1 to about 10:90; optionally about 95:5 to about 10:90.

A82: An activated Portland slag cement concrete, comprising a ground mixture of:
  i) Portland clinker;
  ii) the GACPM any one of embodiments A1-A31;
  iii) sand (fine aggregate);
  iv) coarse aggregates; and
  v) water;
wherein the Portland clinker to the GACPM of any one of embodiments A1-A31 are ground together in a weight ratio of about 99:1 to about 10:90; optionally about 95:5 to about 10:90.

A82. The activated Portland slag cement concrete of embodiment A81, wherein the activated Portland slag cement concrete mixture is designed according to ACI 211 (American concrete Institute) with an activated Portland slag cement content 200-500 kg/m$^3$ and a slump of 0-25 cm for targeted 28 days strength of 15-60 MPa; optionally 20-60 MPa.

A83-A91. BLANK.

A92. The activated Portland slag cement concrete of any one of embodiments A81-A91, wherein the sand is ASTM C33 sand (fine aggregate).

A93. The activated Portland slag cement concrete any one of embodiments A81-A92, wherein the coarse aggregates is with any grading of ASTM C 33 (Table 2).

A94. The activated Portland slag cement mortar or grout of any one of embodiments A70-A80, wherein the activated Portland slag cement mortar or grout has greater compressive strength relative to a similar proportioned mortar grout mixture of (i) Portland cement, (ii) GGBFS, (3) sand (fine aggregate), and (4) water, as measured at 1 day, 7 days, and 28 days.

A95. The activated Portland slag cement mortar or grout of embodiment A94, wherein the activated Portland slag cement mortar or grout has between about 5-40% greater, such as about 5-33% greater, compressive strength relative to a similar proportioned mortar grout mixture of (i) Portland cement, (ii) GGBFS, (3) sand (fine aggregate), and (4) water, as measured at 1 day, 7 days, and 28 days.

A96. The activated Portland slag cement mortar or grout of embodiment A95, wherein the activated Portland slag cement mortar or grout has between about 5-35%, 5-33%, 5-30%, 5-25%, 5-20%, 5-15%, 5-10%, 10-40%, 10-35%, 10-33%, 10-30%, 10-25%, 10-20%, 10-15%, 15-40%, 15-35%, 15-33%, 15-30%, 15-25%, 15-20%, 20-40%, 20-35%, 20-33%, 20-30%, 20-25%, 25-40%, 25-35%, 25-33%, 25-30%, 30-40%, 30-35%, or 35-40% greater compressive strength relative to a similar proportioned mortar grout mixture of (i) Portland cement, (ii) GGBFS, (3) sand (fine aggregate), and (4) water, as measured at 1 day, 7 days, and 28 days.

A97. The activated Portland slag cement mortar or grout of embodiment A96, wherein the activated Portland slag cement mortar or grout has about 5%, 10%, 15%, 20%, 25%, 30%, 33%, 35%, or 40% greater compressive strength relative to a similar proportioned mortar grout mixture of (i) Portland cement, (ii) GGBFS, (3) sand (fine aggregate), and (4) water, as measured at 1 day, 7 days, and 28 days.

A98. The activated Portland slag cement concrete of any one of embodiments A81-A93, wherein the activated Portland slag cement concrete has greater compressive strength relative to a similar proportioned concrete mixture of (i) Portland cement, (ii) GGBFS, (3) sand (fine aggregate), (4) coarse aggregates, and (5) water, as measured at 1 day, 7 days, and 28 days.

A99. The activated Portland slag cement concrete of embodiment A98, wherein the activated Portland slag cement concrete has between about 5-40% greater, such as about 5-33% greater, compressive strength relative to a similar proportioned concrete mixture of (i) Portland cement, (ii) GGBFS, (3) sand (fine aggregate), (4) coarse aggregates, and (5) water, as measured at 1 day, 7 days, and 28 days.

A100. The activated Portland slag cement concrete of embodiment A99, wherein the activated Portland slag cement concrete has between about 5-35%, 5-33%, 5-30%, 5-25%, 5-20%, 5-15%, 5-10%, 10-40%, 10-35%, 10-33%, 10-30%, 10-25%, 10-20%, 10-15%, 15-40%, 15-35%, 15-33%, 15-30%, 15-25%, 15-20%, 20-40%, 20-35%, 20-33%, 20-30%, 20-25%, 25-40%, 25-35%, 25-33%, 25-30%, 30-40%, 30-35%, or 35-40% greater compressive strength relative to a similar proportioned concrete mixture of (i) Portland cement, (ii) GGBFS, (3) sand (fine aggregate), (4) coarse aggregates, and (5) water, as measured at 1 day, 7 days, and 28 days.

A101. The activated Portland slag cement concrete of embodiment A100, wherein the activated Portland slag cement concrete has about 5%, 10%, 15%, 20%, 25%, 30%, 33%, 35%, or 40% greater compressive strength relative to a similar proportioned concrete mixture of (i) Portland cement, (ii) GGBFS, (3) sand (fine aggregate), (4) coarse aggregates, and (5) water, as measured at 1 day, 7 days, and 28 days.

A102. A method of preparing ground activated cementitious precursor material (GACPM), comprising: grinding for a period of time a mixture comprising (a) granulated slag, (b) a grinding aid, and (c) optionally, pozzolanic material; wherein the ground activated cementitious precursor material has a Blaine fineness of between about 100-1000 m$^2$/kg.

A103. The method of embodiment A102, wherein the mixture ground to prepare the ground precursor activated cementitious precursor material is exclusive of an alkali activator.

A104. The method of any one of embodiments A102 or A103, wherein mixture is ground using a laboratory-scale grinding mill with three different ball sizes, a fixed quantity of balls, and a standardized RPM or at a processing site with a concrete mixture machine or at a ready mixed concrete plant.

A105. The method of any one of embodiments A102-A104, wherein the grinding period of time is between about 60-270 minutes, such as between about 90-270, 90-240, 120-240, 180-240, 210-240, 120-240, 150-240, 180-240, or 210-240 minutes, such as at least 90, 120, 150, 180, 210 or 240 minutes.

A106. The method of any one of embodiments A102-A105, wherein mixture is ground for the same period of time or the same percentage of time as used for grinding a mixture of (a) granulated slag and (c) optionally, pozzolanic material, for said period of time in the absence of grinding aid (b).

A107. The method of any one of embodiments A102-A106, wherein the Blaine fineness (m$^2$/kg) is measured using a Blaine Air Permeability apparatus according to ASTM C204 standards.

A108. BLANK.

A109. The method of any one of embodiments A102-A108, wherein the Blaine fineness of the ground activated cementitious precursor material is finer relative to a Blaine fineness resulting from grinding a mixture of (a) granulated slag and (c) optionally, pozzolanic material, for said period of time in the absence of grinding aid (b).

A110. The method of embodiment A109, wherein the Blaine fineness of the ground activated cementitious precursor material is between about 10-50% finer relative to a Blaine fineness resulting from grinding a mixture of (a) granulated slag and (c) optionally, pozzolanic material, for the same period of time in the absence of grinding aid (b).

A111. The method of embodiment A110, wherein the Blaine fineness of the ground activated cementitious precursor material is between about 15-50%, 20-50%, 25-50%, 30-50%, 35-50%, 40-50%, 45-50%, 15-30%, 15-40%, or 20-35% finer relative to a Blaine fineness resulting from grinding a mixture of (a) granulated slag and (c) optionally, pozzolanic material, for the same period of time in the absence of grinding aid (b).

A112. The method of embodiment A110 or A111, wherein the Blaine fineness of the ground activated cementitious precursor material is at least 15%, 20%, 25%, 30%, 35%, 40%, or 45% finer relative to a Blaine fineness resulting from grinding a mixture of (a) granulated slag and (c) optionally, pozzolanic material, for the period of same time in the absence of grinding aid (b).

A113. The method of any one of embodiments A102-A112, wherein the grinding aid reduces the period of time necessary to achieve the Blaine fineness of the ground activated cementitious precursor material relative to the time period required to achieve the same Blaine fineness from grinding a mixture of (a) granulated slag and (c) optionally, pozzolanic material, in the absence of grinding aid (b).

A114. The method of embodiment A113, wherein the period of time necessary to achieve the Blaine fineness of the ground activated cementitious precursor material is reduced by between about 10-50% relative to the time period required to achieve the same Blaine fineness from grinding a mixture of (a) granulated slag and (c) optionally, pozzolanic material, in the absence of grinding aid (b).

A115. The method of embodiment A114, wherein the period of time necessary to achieve the Blaine fineness of the ground activated cementitious precursor material is reduced by between about 15-50%, 20-50%, 25-50%, 30-50%, 35-50%, 40-50%, 45-50%, 15-30%, 15-40%, or 20-35% relative to the time period required to achieve the same Blaine fineness from grinding a mixture of (a) granulated slag and (c) optionally, pozzolanic material, in the absence of grinding aid (b).

A116. The method of embodiment A114 or A115, wherein the period of time necessary to achieve the Blaine fineness of the ground activated cementitious precursor material is reduced by at least 15%, 20%, 25%, 30%, 35%, 40%, or 45% relative to the time period required to achieve the same Blaine fineness from grinding a mixture of (a) granulated slag and (c) optionally, pozzolanic material, in the absence of grinding aid (b).

A117. The method of any one of embodiments A102-A116, wherein the method reduces the amount of carbon emissions produced over the period of time necessary to achieve the Blaine fineness of the GACPM relative to the amount of carbon emissions produced over the same time period required to achieve the same Blaine fineness resulting from grinding a mixture of (a) granulated slag and (c) optionally, pozzolanic material, for the same period of time in the absence of grinding aid (b).

A118. The method of embodiment A117, wherein the amount of carbon emissions produced over the period of time necessary to achieve the Blaine fineness of the GACPM is reduced by between about 10-50% relative to the same time period required to achieve the same Blaine fineness from grinding a mixture of (a) granulated slag and (c) optionally, pozzolanic material, in the absence of grinding aid (b).

A119. The method of embodiment A117 or A118, wherein the amount of carbon emissions produced over the period of time necessary to achieve the Blaine fineness of the GACPM is reduced by between about 15-50%, 20-50%, 25-50%, 30-50%, 35-50%, 40-50%, 45-50%, 15-30%, 15-40%, or 20-35%, such as reduced by at least 15%, 20%, 25%, 30%, 35%, 40%, or 45%, relative to the same time period required to achieve the same Blaine fineness from grinding a mixture of (a) granulated slag and (c) optionally, pozzolanic material, in the absence of grinding aid (b).

A120. A method of preparing the activated Portland slag cement mortar or grout of any one of embodiments A70-A80 or A94-A97, wherein the method comprises: blending or grinding together for a period of time the mixture of (i) the Portland cement and/or Portland clinker; (ii) the GACPM of any one of embodiments A1-A31; (iii) the sand (fine aggregates); and (iv) the water.

A121. The method of embodiment A120, wherein the method comprises blending if Portland cement, and the method comprises grinding if Portland clinker is used.

A122. A method of preparing the activated Portland slag cement concrete of any one of embodiments A81-A93 or A98-A101, wherein the method comprises: blending or grinding together for a period of time the mixture of (i) the Portland cement and/or Portland clinker; (ii) the GACPM of any one of embodiments A1-A31; (iii) the sand (fine aggregate); (iv) the coarse aggregates, and (v) the water.

A123. The method of embodiment A122, wherein the method comprises blending if Portland cement, and the method comprises grinding if Portland clinker is used.

B1. A ground activated cementitious precursor material (GACPM), comprising a ground together mixture of: (a) unground granulated slag; and (b) a grinding aid; and (c) optionally, pozzolanic material.

B2. The ground activated cementitious precursor material of embodiment B1, wherein the granulated slag comprises granulated blast furnace slag (GBFS), granulated pig iron slag, granulated steel furnace slag, granulated basic oxygen furnace slag, granulated electric arc furnace slag, or a combination thereof.

B3. The ground activated cementitious precursor material of embodiment B1 or embodiment B2, wherein the grinding aid comprises:
  i) Aluminum sulfate with a formula: $Al_2(SO_4)_3 \cdot nH_2O$, wherein n is 0-18, preferably wherein n is 12;
  ii) Alum with a formula: $AB(SO_4)_x \cdot nH_2O$, wherein A is K (potassium), Na (sodium), or $NH_4$ (ammonium); B is Al (aluminum), Cr (chromium), Fe (iron), or Co (cobalt); x is 2-4, preferably 2; and n is 0-18, preferably 12; and/or
  iii) Na salt, K salt, or Li salt of a hydroxycarboxylic acid, wherein the
  hydroxycarboxylic acid comprises citric, lactic, glycolic, tartaric, acetic, or malic acid;
  or a combination of thereof.

B4. The ground activated cementitious precursor material of any one of embodiments B1-B3, wherein the granulated slag is present in the ground precursor activated cementitious precursor material at a weight percentage of between about 50-99.9% by weight.

B5. The ground activated cementitious precursor material of any one of embodiments B1-B4, wherein the grinding aid is present in the ground precursor activated cementitious precursor material at a weight percentage of between about 0.1-10% by weight.

B6. The ground activated cementitious precursor material of any one of embodiments B1-B5, wherein the optional pozzolanic material is present in the ground activated cementitious precursor material; optionally wherein the pozzolanic material is present in the ground precursor activated cementitious precursor material at a weight percentage of between about 0-50% by weight.

B7. The ground activated cementitious precursor material of embodiment B6, wherein the pozzolanic material comprises F fly ash, Class C fly ash, silica fume, natural pozzolana, glass, calcined clay, or mixtures thereof.

B8. The ground activated cementitious precursor material of any one of embodiments B1-B7, wherein the ground precursor activated cementitious precursor material has a Blaine fineness of between about 100-1000 $m^2/kg$.

B9. The ground activated cementitious precursor material of any one of embodiments B1-B8, wherein the ground precursor activated cementitious precursor material is exclusive of an alkali activator.

B10. An activated geopolymer cement, comprising a blended mixture of the ground activated cementitious precursor material of any one of embodiments B1-B9 and one or more alkali activators.

B11. The activated geopolymer cement of embodiment B10, wherein the one or more alkali activators comprises sodium hydroxide, potassium hydroxide, sodium silicate, potassium silicate, sodium carbonate, or potassium carbonate, or a combination thereof.

B12. An activated geopolymer mortar or grout, comprising the activated geopolymer cement of embodiment B10 or embodiment B11, sand (fine aggregate), and water.

B13. The activated geopolymer mortar or grout of embodiment B12, wherein the activated geopolymer mortar or grout has greater compressive strength relative to conventional geopolymer mortar, as measured at 1 day, 7 days, and 28 days.

B14. An activated geopolymer concrete, comprising the activated geopolymer cement of embodiment B10 or embodiment B11, sand (fine aggregate), coarse aggregates, and water.

B15. The activated geopolymer concrete of embodiment B14, wherein the activated geopolymer concrete is designed according to ACI 211 (American concrete Institute) with an activated geopolymer cement content 200-500 $kg/m^3$ and a slump 0-25 cm for targeted 28 days strength of 15-60 MPa, optionally 20-60 MPa.

B16. The activated geopolymer concrete of embodiment B14 or embodiment B15, wherein the activated geopolymer concrete has greater compressive strength relative to conventional geopolymer concrete, as measured at 1 day, 7 days, and 28 days.

B17. An activated Portland slag cement mortar or grout comprising a mixture of:
  i) Portland cement and/or Portland clinker;
  ii) the GACPM of any one of embodiments B1-B9;
  iii) sand (fine aggregate); and
  iv) water;
wherein the Portland cement and/or Portland clinker to said GACPM in the mixture are in a weight ratio of about 99:1 to about 10:90; optionally about 95:5 to about 10:90; and wherein the mixture is a blended mixture when comprising Portland cement, and the mixture is a grinded mixture when comprising Portland clinker.

B18. An activated Portland slag cement concrete, comprising a mixture of:
  i) Portland cement and/or Portland clinker;
  ii) the GACPM of any one of embodiments B1-B9;
  iii) sand (fine aggregate);
  iv) coarse aggregates; and
  v) water;
wherein the Portland cement and/or Portland clinker to said GACPM in the mixture are in a weight ratio of about 99:1 to about 10:90; optionally about 95:5 to about 10:90; and wherein the mixture is a blended mixture when comprising Portland cement, and the mixture is a grinded mixture when comprising Portland clinker.

B19. The activated Portland slag cement concrete of embodiment B18, wherein the activated Portland slag cement concrete is designed according to ACI 211 (American concrete Institute) with an activated Portland slag cement content 200-500 kg/m3 and a slump 0-25 cm for targeted 28 days strength of 15-60 MPa, optionally 20-60 MPa.

B20. The activated Portland slag cement mortar or grout of embodiment B17, wherein the activated Portland slag cement mortar or grout has greater compressive strength relative to a similar proportioned mortar grout mixture of (i) Portland cement, (ii) GGBFS, (3) sand (fine aggregate), and (4) water, as measured at 1 day, 7 days, and 28 days.

B21. The activated Portland slag cement concrete of embodiment B18, wherein the activated Portland slag cement concrete has greater compressive strength relative to a similar proportioned concrete mixture of (i) Portland cement, (ii) GGBFS, (3) sand (fine aggregate), (4) coarse aggregates, and (5) water, as measured at 1 day, 7 days, and 28 days.

B22. A method of preparing ground activated cementitious precursor material (GACPM), comprising: grinding for a period of time a mixture comprising (a) unground granulated slag, (b) a grinding aid, and (c) optionally, pozzolanic material; wherein the ground activated cementitious precursor material has a Blaine fineness of between about 100-1000 $m^2$/kg.

B23. The method of embodiment B22, wherein the Blaine fineness of the ground activated cementitious precursor material is finer relative to a Blaine fineness resulting from grinding a mixture of (a) granulated slag and (c) optionally, pozzolanic material, for said period of time in the absence of grinding aid (b).

B24. The method of embodiment B22 or embodiment B23, wherein the method (use of the grinding aid) reduces the period of time necessary to achieve the Blaine fineness of the ground activated cementitious precursor material relative to the time period required to achieve the same Blaine fineness from grinding a mixture of (a) granulated slag and (c) optionally, pozzolanic material, in the absence of grinding aid (b).

B25. The method of any one of embodiments B22-B24, wherein the method (use of the grinding aid) reduces the amount of carbon emissions produced over the period of time necessary to achieve the Blaine fineness of the GACPM relative to the amount of carbon emissions produced over the same time period required to achieve the same Blaine fineness resulting from grinding a mixture of (a) granulated slag and (c) optionally, pozzolanic material, for the same period of time in the absence of grinding aid (b).

B26. A method of preparing the activated Portland slag cement mortar or grout of embodiment B17, wherein the method comprises: mixing for a period of time the mixture of (i) the Portland cement and/or Portland clinker (ii) the GACPM of any one of embodiments B1-B9; (iii) the sand (fine aggregate); and (iv) the water; wherein if the mixture comprises Portland cement then mixing is blending, if the mixture comprises Portland clinker then the mixing is grinding.

B27. A method of preparing the activated Portland slag cement concrete of embodiment B18, wherein the method comprises: mixing for a period of time the mixture of (i) the Portland cement and/or Portland clinker; (ii) the GACPM of any one of embodiments B1-B9; (iii) the sand (fine aggregate); (iv) the coarse aggregates, and (v) the water; wherein if the mixture comprises Portland cement then mixing is blending, if the mixture comprises Portland clinker then the mixing is grinding.

7. EXAMPLES

Ground Activated Cementitious Precursor Material (GACPM) Compositions

Ground Activated Cementing Precursor Material (GACPM) is produced by grinding or intergrading granulated slag (such as granulated blast furnace slag (GBFS)), with or without pozzolanic materials, and one or more grinding aids. Examples 1 to 12, provides various combinations of ingredients, which are summarized in Table 1.

TABLE 1

Ground Activated Cementitious Precursor Material (GACPM) Composition

| Example # | Slag-GBFS, wt. % | Pozzolanic material-Class F fly ash, wt. % | Grinding Aid-Aluminum sulfate, wt. % | Grinding Aid-Alum, wt. % | Grinding Aid-Sodium lactate liq (60% solid), wt. % | Total, wt. % |
|---|---|---|---|---|---|---|
| 1 | 99.5 | 0 | 0.5 | 0 | 0 | 100 |
| 2 | 99.0 | 0 | 1.0 | 0 | 0 | 100 |
| 3 | 98.5 | 0 | 1.5 | 0 | 0 | 100 |
| 4 | 99.5 | 0 | 0 | 0.5 | 0 | 100 |
| 5 | 99.0 | 0 | 0 | 1.0 | 0 | 100 |
| 6 | 98.5 | 0 | 0 | 1.5 | 0 | 100 |
| 7 | 99.5 | 0 | 0 | 0 | 0.5 | 100 |
| 8 | 99.0 | 0 | 0 | 0 | 1.0 | 100 |
| 9 | 98.5 | 0 | 0 | 0 | 1.5 | 100 |
| 10 | 87.5 | 12 | 0.5 | 0 | 0 | 100 |
| 11 | 87.0 | 12 | 1 | 0 | 0 | 100 |
| 12 | 86.5 | 12 | 1.5 | 0 | 0 | 100 |

Tables 2 and 3 show the effects of the grinding aids aluminum sulfate and alum on the fineness of the resulting GACPM powder. Grinding time is a significant variable influenced by factors such as the type of grinding mill, the size and quantity of grinding balls, the amount of material being ground, and the mill's RPM. The instant examples used a laboratory-scale grinding mill with three different ball sizes, a fixed quantity of balls, and a standardized RPM. All experiments were performed under identical conditions. While grinding time may vary when using different mills or setups, the percentage of time saved remains consistent with the use of our grinding aid. The fineness was measured as specific surface area ($m^2$/kg) using a Blaine Air Permeability apparatus according to ASTM C204 standards. The Blaine fineness was measured every 30 minutes for up to 4 hours of grinding time. Examples 13 in Table 2 and 17 in Table 3 serve as control mixes, where granulated slag (here, GBFS) was ground without any grinding aids.

In Table 2, the control mix (Example 13), in which GBFS was ground without a grinding aid, required 4 hours to reach a Blaine fineness of 499 $m^2$/kg. In contrast, the same GBFS ground with 1% aluminum sulfate (Example 15) achieved a similar fineness of 491 $m^2$/kg in only 2 hours and 30 minutes. This result suggests a significant reduction in grinding time, which translates into a savings in energy, cost, and/or carbon emissions associated with the grinding process.

Similarly, in Table 3, the control mix (Example 17), ground without a grinding aid, also required 4 hours to reach a Blaine fineness of 499 $m^2$/kg. However, when ground in the presence of a grinding aid, such as 1% alum (Example 19), the same fineness of 495.5 $m^2$/kg was achieved in just 3 hours. This result also demonstrates potential time, energy, cost, and/or carbon emission savings due to the use of grinding aids.

TABLE 2

| Example # | GACPM details | Blain Fineness at various time, m²/kg | | | | | | | |
|---|---|---|---|---|---|---|---|---|---|
| | | 0 H:30 m | 1 H:00 M | 1 H:30 M | 2 H:00 M | 2 H:30 M | 3 H:00 M | 3 H:30 M | 4 H:00 M |
| 13 | Control (Slag + No grinding aid) | 12.4 | 192.7 | 272.5 | 304.7 | 329.1 | 369 | 430.9 | 499.2 |
| 14 | Example 1 (GACM, Slag + 0.5% Aluminium sulfate) | 17.9 | 192.7 | 295 | 332.8 | 421.9 | 426.6 | 492.4 | 563.8 |
| 15 | Example 2 (GACM, Slag + 1.0% Aluminium sulfate) | 19.6 | 208.1 | 294.4 | 421.9 | 491.2 | 529.9 | 553.7 | 650.6 |
| 16 | Example 3 (GACM, Slag + 1.5% Aluminium sulfate) | 18.2 | 212.7 | 301.3 | 428.2 | 507.6 | 531.9 | 582.4 | 680 |

TABLE 3

| Example # | GACPM details | Blain Fineness at various time, m²/kg | | | | | | | |
|---|---|---|---|---|---|---|---|---|---|
| | | 0 H:30 m | 1 H:00 M | 1 H:30 M | 2 H:00 M | 2 H:30 M | 3 H:00 M | 3 H:30 M | 4 H:00 M |
| 17 | Control (Slag + No grinding aid) | 12.4 | 192.7 | 272.5 | 304.7 | 329.1 | 369 | 430.9 | 499.2 |
| 18 | Example 4 (GACM, Slag + 0.5% Alum) | 14.5 | 184 | 284.5 | 316 | 382 | 406 | 475 | 534 |
| 19 | Example 5 (GACM, Slag + 1.0% Alum) | 17.2 | 189 | 290 | 368 | 47 | 495.5 | 524 | 621 |
| 20 | Example 6 (GACM, Slag + 1.5% Alum) | 18 | 202 | 295 | 375.5 | 487 | 510 | 550 | 641 |

Geopolymer and Activated Geopolymer Mortar Compositions

Geopolymer mortar ingredients (control): ground, granulated slag that was ground without any grinding aid (GGBFS), one or more alkali activators (sodium hydroxide, sodium silicate or sodium carbonate), ASTM C33 sand, and water 35% of cement wight (W/C=0.35).

Activated geopolymer mortar ingredients: GACPM (prepared from GBFS that was ground with a grinding aid as indicated in Table 1 (Examples 1 to 12), one or more alkali activators (sodium hydroxide, sodium silicate or sodium carbonate), ASTM C 33 sand, and water 35% of cement weight (W/C=0.35).

Geopolymer mortar and activated geopolymer mortar proportion and test methods: The mix design for the geopolymer mortar consists of 1 part cement to 2 parts ASTM C33 sand, with a water-to-cement (W/C) ratio of 0.35. All ingredients were mixed in a Hobart mixer following ASTM C305 guidelines. The Flow test was performed according to ASTM C1437, and compressive strength were measured following ASTM C109.

TABLE 4

Mortar Examples (1 part Cement:2 part ASTM C 33 sand)
Comparing Control mix (Ground slag only) and Various GACPM

|  | Example 21 Slag with no grinding aid (Control Mix 1) | Example 22 Slag with no grinding aid (Control Mix 2) | Example 23 GACPM (Example 1) with 0.5% Aluminium sulfate (grinding aid) | Example 24 GACPM (Example 2) with 1.0% Aluminium sulfate (grinding aid) | Example 25 GACPM (Example 3) with 1.5% Aluminium sulfate (grinding aid) | Example 26 GACPM (Example 2) with 1.0% Aluminium sulfate (grinding aid) |
|---|---|---|---|---|---|---|
| Ground Slag (GGBFS) | 92% | 92% | 0% | 0% | 0% | 0 |
| GACPM | 0% | 0% | 92% | 92% | 92% | 92% |
| Sodium Hydroxide | 5% | 3% | 5% | 5% | 5% | 3% |
| Sodium Silicate | 0% | 5% | 0% | 0% | 0% | 5% |
| Sodium Carbonate | 3% | 0% | 3% | 3% | 3% | 0% |
| Water/Cement ratio | 0.35 | 0.35 | 0.35 | 0.35 | 0.35 | 0.35 |
| Results |  |  |  |  |  |  |
| 1-day Strength, MPa | 16.3 | 16.1 | 16 | 18.7 | 17.4 | 18.9 |
| 3-day Strength, MPa | 21 | 22 | 22.6 | 25.2 | 23.4 | 26.8 |
| 7-day Strength, MPa | 27.1 | 28.5 | 29.2 | 33.1 | 29.3 | 34.5 |
| 28-day Strength, MPa | 42.4 | 44.2 | 46.6 | 53.5 | 49.7 | 53.2 |

TABLE 5

Mortar Examples (1 part Cement:2 part ASTM C 33 sand)
Comparing Control mix (Ground slag only) and Various GACPM

|  | Example 27 Slag with no grinding aid (Control 1) | Example 28 Slag with no grinding aid (Control 2) | Example 29 GACPM (Example 1) with 0.5% Alum (grinding aid) | Example 30 GACPM (Example 2) with 1.0% Alum (grinding aid) | Example 31 GACPM (Example 3) with 1.5% Alum (grinding aid) | Example 32 GACPM (Example 2) with 1.0% Alum (grinding aid) |
|---|---|---|---|---|---|---|
| Ground Slag (GGBFS) | 92% | 92% | 0% | 0% | 0% | 0% |
| GACPM | 0% | 0% | 92% | 92% | 92% | 92% |
| Sodium Hydroxide | 5% | 3% | 5% | 5% | 5% | 3% |
| Sodium Silicate | 0% | 5% | 0% | 0% | 0% | 5% |
| Sodium Carbonate | 3% | 0% | 3% | 3% | 3% | 0% |
| Water/Cement ratio | 0.35 | 0.35 | 0.35 | 0.35 | 0.35 | 0.35 |
| Results |  |  |  |  |  |  |
| 1-day Strength, MPa | 16.3 | 15.0 | 15.8 | 18.1 | 17.0 | 18.1 |
| 3-day Strength, MPa | 21.0 | 21.6 | 22.2 | 24.2 | 24.4 | 26.9 |
| 7-day |  |  |  |  |  |  |

TABLE 5-continued

Mortar Examples (1 part Cement:2 part ASTM C 33 sand)
Comparing Control mix (Ground slag only) and Various GACPM

|  | Example 27 Slag with no grinding aid (Control 1) | Example 28 Slag with no grinding aid (Control 2) | Example 29 GACPM (Example 1) with 0.5% Alum (grinding aid) | Example 30 GACPM (Example 2) with 1.0% Alum (grinding aid) | Example 31 GACPM (Example 3) with 1.5% Alum (grinding aid) | Example 32 GACPM (Example 2) with 1.0% Alum (grinding aid) |
|---|---|---|---|---|---|---|
| Strength, MPa 28-day | 27.1 | 28.2 | 29 | 33.2 | 29.8 | 34.8 |
| Strength, MPa | 42.4 | 44.0 | 45.6 | 53.0 | 49.9 | 53.8 |

The control mix of geopolymer mortar, shown in Table 4 (Example 21), used slag ground without any grinding aid (GGBFS), one or more alkali activators (sodium hydroxide, sodium silicate or sodium carbonate), and a mix ratio of 1 part geopolymer cement to 2 parts ASTM C33 sand, and water 35% of cement wight (W/C=0.35). This mix achieved compressive strengths of 16.3 MPa at 1 day, 21.0 MPa at 3 days, 27.1 MPa at 7 days, and 42.4 MPa at 28 days. In contrast, the activated geopolymer mortar, as shown in Table 4 (Example 24), used GACPM (prepared from GBFS that was ground with a 1% aluminum sulfate grinding aid) with one or more alkali activators (sodium hydroxide, sodium silicate or sodium carbonate), and the same mix ratio as the control and achieved compressive strengths of 18.7 MPa at 1 day, 25.2 MPa at 3 days, 33.1 MPa at 7 days, and 53.5 MPa at 28 days. This represents an improvement in compressive strength of 14.7 to 26.2% when using GACPM instead of GGBFS. Similar improvements in compressive strength were observed with different combinations of alkali activators for both GGBFS and GACPM, as shown in Table 4 (Examples 22 and 26).

The control mix for geopolymer mortar, as shown in Table 5 (Example 27), used slag ground without any grinding aid (GGBFS), one or more alkali activators (sodium hydroxide, sodium silicate or sodium carbonate), and a mix ratio of 1 part geopolymer cement to 2 parts ASTM C33 sand, and water 35% of cement wight (W/C=0.35). This mix achieved compressive strengths of 16.3 MPa at 1 day, 21.0 MPa at 3 days, 27.1 MPa at 7 days, and 42.4 MPa at 28 days. In comparison, the activated geopolymer mortar, shown in Table 5 (Example 30), used GACPM (prepared from GBFS that was ground with 1% alum grinding aid) with one or more alkali activators (sodium hydroxide, sodium silicate or sodium carbonate), and the same mix ratio as the control and achieved compressive strengths of 18.1 MPa at 1 day, 24.2 MPa at 3 days, 33.2 MPa at 7 days, and 53.0 MPa at 28 days. The results demonstrated an improvement in compressive strength of 11.0 to 25.0% with the use of GACPM compared to the control mix using GGBFS. Similar improvements in compressive strength were observed when GGBFS and GACPM were used with different combinations of alkali activators, as indicated in Table 5 (Examples 28 and 32).

Geopolymer Concrete and Activated Geopolymer Concrete Compositions

Geopolymer concrete ingredients (control): ground, granulated slag that was ground without any grinding aid (GGBFS), one or more alkali activators (sodium hydroxide, sodium silicate or sodium carbonate), ASTM C33 sand, ASTM C 33 coarse aggregates, and appropriate amount of water to achieve 13 to 16 cm slump.

Activated Geopolymer concrete ingredients: GACPM (prepared from GBFS that was ground with grinding aid) as indicated in Table 1 (Examples 1 to 12), one or more alkali activators (sodium hydroxide, sodium silicate or sodium carbonate), ASTM C33 sand, ASTM C 33 coarse aggregates, and appropriate amount of water to achieve 13 to 16 cm slump.

Geopolymer concrete and Activated geopolymer concrete mix proportion and test methods: Concrete mix design as per American Concrete Institute (ACI) concrete mix design method, ACI 211: Standard Practice for Selecting Proportions for Normal, Heavyweight, and Mass Concrete. Slump test as per ASTM C 143 standard, and compressive strength as per ASTM C 39 standard.

TABLE 6

Geopolymer concrete and Activated geopolymer Concrete Examples.
Comparing Control mix (Ground slag) and GACPM

|  | Example 33 Control mix 1: Slag with no grinding aid 280 kg/m³ cement level | Example 34 GACPM (Example 2) with 1.0% Aluminium sulfate (grinding aid) 280 kg/m³ cement level | Example 35 Control mix 2: Slag with no grinding aid (440 kg/m³ cement level) | Example 36 GACPM (Example 2) with 1.0% Aluminium sulfate (grinding aid), 440 kg/m³ cement level |
|---|---|---|---|---|
| Ground Slag (GGBFS) | 92% | 0% | 92% | 0% |
| GACPM | 0% | 92% | 0% | 92% |
| Sodium Hydroxide | 5% | 5% | 5% | 5% |
| Sodium Silicate | 0% | 0% | 0% | 0% |
| Sodium Carbonate | 3% | 3% | 3% | 3% |
| Cement ingredient total | 100% | 100% | 100% | 100% |
| Cement level in concrete | 280 kg/m3 | 280 kg/m3 | 440 kg/m3 | 440 kg/m3 |
| Fine Aggregate | 727 kg/m3 | 727 kg/m3 | 550.9 kg/m3 | 550.9 kg/m3 |
| Coarse Aggregate | 1319 kg/m3 | 1319 kg/m3 | 1319 kg/m3 | 1319 kg/m3 |
| Water/Cement ratio | 0.45 | 0.45 | 0.38 | 0.38 |

TABLE 6-continued

Geopolymer concrete and Activated geopolymer Concrete Examples. Comparing Control mix (Ground slag) and GACPM

|  | Example 33 Control mix 1: Slag with no grinding aid 280 kg/m³ cement level | Example 34 GACPM (Example 2) with 1.0% Aluminium sulfate (grinding aid) 280 kg/m³ cement level | Example 35 Control mix 2: Slag with no grinding aid (440 kg/m³ cement level) | Example 36 GACPM (Example 2) with 1.0% Aluminium sulfate (grinding aid), 440 kg/m³ cement level |
|---|---|---|---|---|
| Results |  |  |  |  |
| Initial slump | 15.5 | 15 | 14 | 14.5 |
| Slump at 90 minutes | 13 | 12 | 10 | 10 |
| 1-day Strength. MPa | 3.1 | 3.8 | 14.3 | 17.2 |
| 3-day Strength, MPa | 12.5 | 15.8 | 24.2 | 27.1 |
| 7-day Strength, MPa | 19.6 | 24.5 | 33.4 | 38.2 |
| 28-day Strength, MPa | 27.5 | 34.1 | 44.2 | 51 |

The control mix for geopolymer concrete, as shown in Table 6 (Example 33), used granulated slag that was ground without any grinding aid (GGBFS). The mix was designed according to the ACI 211 method, with the following proportions: 280 kg/m³ cement, 727 kg/m³ sand, 1319 kg/m³ coarse aggregate, and appropriate amount of water to achieve a slump of 15.5 cm. This mix achieved compressive strengths of 3.1 MPa at 1 day, 12.5 MPa at 3 days, 19.6 MPa at 7 days, and 27.5 MPa at 28 days. In comparison, the activated geopolymer concrete, as shown in Table 6 (Example 34), used GACPM (prepared from granulated slag that was ground with 1% aluminum sulfate grinding aid) and was designed with the same criteria as the control. This mix achieved compressive strengths of 3.8 MPa at 1 day, 15.8 MPa at 3 days, 24.5 MPa at 7 days, and 34.1 MPa at 28 days. These results demonstrate an improvement in compressive strength of 22 to 26% with the use of GACPM, replacing GGBFS in green, non-Portland cement-based concrete.

The second control mix for geopolymer concrete, as shown in Table 6 (Example 35), used granulated slag that was ground without any grinding aid (GGBFS). It was designed following the ACI 211 method, with proportions of 440 kg/m³ cement, 550.9 kg/m³ sand, 1319 kg/m³ coarse aggregate, and appropriate amount of water to achieve a slump of 14 cm. This mix achieved compressive strengths of 14.3 MPa at 1 day, 24.2 MPa at 3 days, 33.4 MPa at 7 days, and 44.2 MPa at 28 days. In comparison, the activated geopolymer concrete, as indicated in Table 6 (Example 36), used GACPM (prepared from granulated slag that was ground with 1% aluminum sulfate grinding aid), designed with the same criteria as the control. This mix achieved compressive strengths of 17.2 MPa at 1 day, 27.1 MPa at 3 days, 38.2 MPa at 7 days, and 51.0 MPa at 28 days. This shows an improvement in compressive strength of 12 to 20% with the use of GACPM compared to the control mix.

Portland Slag Mortar and Portland GACPM Mortar Compositions

Portland slag mortar ingredients (control): Portland cement, ground, granulated slag which was ground without the use of any grinding aid (GGBFS), graded sand (ASTM C 109), and water 48.5% of cement weight (W/C=0.485)

Portland GACPM mortar ingredients: Portland cement, GACPM (granulated slag which was ground with the use of a grinding aid) as indicated in Table 1 (Examples 1 to 12), graded sand (ASTM C 109), and water 48.5% of cement weight (W/C=0.485)

Portland slag mortar and Portland GACPM mortar proportion and test methods: The mortar was prepared and tested in accordance with ASTM C109. The mix ratio consisted of 1 part Portland slag cement or Portland GACPM cement to 2.75 parts graded standard sand by weight, with a water-to-cement ratio of 0.485. All ingredients were mixed in a Hobart mixer following ASTM C305 guidelines. The flow was tested according to ASTM C1437, and compressive strength was determined in accordance with ASTM C109.

TABLE 7

Portland slag Mortars made as per ASTM C 109: comparing control mix (Portland cement + slag) and Portland cement + GACPM (with grinding aid)

|  | Example 37 Control mix: Portland cement + Slag (ground without grinding aid) 50:50 proportion | Example 38 Portland cement + GACPM (Ground with Aluminium Sulfate 1%) 50:50 proportion | Example 39 Portland cement + GACPM (Ground with Aluminium Sulfate 1%) 40:60 proportion | Example 40 Portland cement + GACPM (Ground with Aluminium Sulfate 1%) 30:70 proportion |
|---|---|---|---|---|
| Flow, mm | 197 | 202 | 200 | 194 |
| Initial set time, min | 360 | 300 | 315 | 345 |
| Final set time, Min | 510 | 380 | 385 | 425 |
| Compressive strength |  |  |  |  |
| 1-day, MPa | 2.6 | 4.7 | 4.5 | 3.1 |
| 3-day, MPa | 12.3 | 17.0 | 14.9 | 12.1 |
| 7-day, MPa | 23.0 | 32.3 | 25.5 | 23.5 |
| 28-day, MPa | 32.1 | 41.9 | 33.4 | 32.2 |

The control mix for Portland slag mortar, as shown in Table 7 (Example 37), used a 50:50 weight ratio of Portland cement to slag. The slag was ground without any grinding aid. The mix consisted of 1 part Portland slag cement to 2.75 parts standard graded sand, with a water-to-cement ratio of 0.485. This mix achieved compressive strengths of 2.6 MPa at 1 day, 12.3 MPa at 3 days, 23.0 MPa at 7 days, and 32.1 MPa at 28 days. In comparison, the Portland GACPM mortar, as indicated in Table 7 (Example 38), used a 50:50 weight ratio of Portland cement to GACPM (slag ground with 1% aluminum sulfate grinding aid). The mix consisted of 1 part Portland GACPM cement to 2.75 parts standard graded sand, with the same water-to-cement ratio of 0.485. This mix achieved compressive strengths of 4.7 MPa at 1 day, 17.0 MPa at 3 days, 32.3 MPa at 7 days, and 41.9 MPa at 28 days. These results show significant improvement in compressive strength with the use of GACPM instead of GGBFS.

What is claimed:

1. A ground activated cementitious precursor material (GACPM), comprising a ground together mixture of:
   (a) at least 90% by weight of unground granulated slag; and
   (b) a grinding aid;
wherein the grinding aid comprises:
   i) Aluminum sulfate with a formula: $Al_2(SO_4)_3 \cdot nH_2O$, wherein n is 0-18; and/or ii) Alum with a formula: AB(SO$_4$)$_x$·nH$_2$O, wherein A is K (potassium), Na (sodium), or NH$_4$ (ammonium); B is Al (aluminum), Cr (chromium), Fe (iron), or Co (cobalt); x is 2-4; and n is 0-18.

2. The ground activated cementitious precursor material of claim 1, wherein the granulated slag comprises granulated blast furnace slag (GBFS), granulated pig iron slag, granulated steel furnace slag, granulated basic oxygen furnace slag, granulated electric arc furnace slag, or a combination thereof.

3. The ground activated cementitious precursor material of claim 1, wherein the grinding aid comprises:
   i) the Aluminum sulfate with a formula: Al$_2$(SO$_4$)$_3$·nH$_2$O, wherein n is 12; and/or
   ii) the Alum with a formula: AB(SO$_4$)$_x$·nH$_2$O, wherein A is K (potassium), Na (sodium), or NH$_4$ (ammonium); B is Al (aluminum), Cr (chromium), Fe (iron), or Co (cobalt); x is 2; and n is 12.

4. The ground activated cementitious precursor material of claim 1, wherein the granulated slag is present in the ground precursor activated cementitious precursor material at a weight percentage of between about 95-99.9% by weight.

5. The ground activated cementitious precursor material of claim 1, wherein the grinding aid is present in the ground activated cementitious precursor material at a weight percentage of between about 0.1-10% by weight.

6. The ground activated cementitious precursor material of claim 1, wherein the ground activated cementitious precursor material further comprises pozzolanic material.

7. The ground activated cementitious precursor material of claim 1, wherein the ground activated cementitious precursor material has a Blaine fineness of between about 100-1000 m$^2$/kg.

8. The ground activated cementitious precursor material of claim 1, wherein the ground activated cementitious precursor material is exclusive of an alkali activator.

9. An activated geopolymer cement, comprising a blended mixture of the ground activated cementitious precursor material of claim 1 and one or more alkali activators.

10. The activated geopolymer cement of claim 9, wherein the one or more alkali activators comprises sodium hydroxide, potassium hydroxide, sodium silicate, potassium silicate, sodium carbonate, or potassium carbonate, or a combination thereof.

11. An activated geopolymer mortar or grout, comprising the activated geopolymer cement of claim 9, fine aggregate, and water.

12. The activated geopolymer mortar or grout of claim 11, wherein the activated geopolymer mortar or grout has greater compressive strength relative to conventional geopolymer mortar, as measured at 1 day, 7 days, and 28 days.

13. An activated geopolymer concrete, comprising the activated geopolymer cement of claim 9, fine aggregate, coarse aggregates, and water.

14. The activated geopolymer concrete of claim 13, wherein the activated geopolymer concrete is designed according to ACI 211 (American concrete Institute) with an activated geopolymer cement content 200-500 kg/m$^3$ and a slump 0-25 cm for targeted 28 days strength of 15-60 MPa.

15. The activated geopolymer concrete of claim 13, wherein the activated geopolymer concrete has greater compressive strength relative to conventional geopolymer concrete, as measured at 1 day, 7 days, and 28 days.

16. An activated Portland slag cement mortar or grout comprising a mixture of:
   i) Portland cement and/or Portland clinker,
   ii) the GACPM of claim 1;
   iii) fine aggregate; and
   iv) water;
wherein the Portland cement and/or Portland clinker to said GACPM in the mixture are in a weight ratio of about 99:1 to about 10:90; and
wherein the mixture is a blended mixture when comprising Portland cement, and the mixture is a grinded mixture when comprising Portland clinker.

17. A method of preparing the activated Portland slag cement mortar or grout of claim 16, wherein the method comprises:
   mixing for a period of time the mixture of (i) the Portland cement and/or Portland clinker (ii) the GACPM; (iii) the fine aggregate; and (iv) the water; wherein if the mixture comprises Portland cement then mixing is blending, if the mixture comprises Portland clinker then the mixing is grinding.

18. A method of preparing ground activated cementitious precursor material (GACPM), comprising:
   grinding for a period of time a mixture comprising (a) at least 90% by weight of unground granulated slag, and (b) a grinding aid;
wherein the grinding aid comprises:
   i) Aluminum sulfate with a formula: Al$_2$(SO$_4$)$_3$·nH$_2$O, wherein n is 0-18; and/or
   ii) Alum with a formula: AB(SO$_4$)$_x$·nH$_2$O, wherein A is K (potassium), Na (sodium), or NH$_4$ (ammonium); B is Al (aluminum), Cr (chromium), Fe (iron), or Co (cobalt); x is 2-4; and n is 0-18;
wherein the ground activated cementitious precursor material has a Blaine fineness of between about 100-1000 m$^2$/kg.

19. The method of claim 18, wherein the Blaine fineness of the ground activated cementitious precursor material is finer relative to a Blaine fineness resulting from grinding a mixture comprising (a) granulated slag for said period of time in the absence of grinding aid (b).

20. The method of claim 18, wherein the method:
   i) reduces the period of time necessary to achieve the Blaine fineness of the ground activated cementitious precursor material relative to the time period required to achieve the same Blaine fineness from grinding a mixture comprising (a) granulated slag in the absence of grinding aid (b); and/or
   ii) reduces the amount of carbon emissions produced over the period of time necessary to achieve the Blaine fineness of the GACPM relative to the amount of carbon emissions produced over the same time period required to achieve the same Blaine fineness resulting from grinding a mixture comprising (a) granulated slag for the same period of time in the absence of grinding aid (b).

* * * * *